United States Patent
Koo et al.

(10) Patent No.: US 12,160,735 B2
(45) Date of Patent: Dec. 3, 2024

(54) METHOD AND APPARATUS TO MANAGE AUTHENTICATION AND SUBSCRIPTION INFORMATION IN WIRELESS COMMUNICATION SYSTEM

(71) Applicant: Samsung Electronics Co., Ltd., Suwon-si (KR)

(72) Inventors: Jonghoe Koo, Suwon-si (KR); Kangjin Yoon, Suwon-si (KR); Duckey Lee, Suwon-si (KR); Sujung Kang, Suwon-si (KR); Taehyung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/556,813

(22) Filed: Dec. 20, 2021

(65) Prior Publication Data

US 2022/0201475 A1  Jun. 23, 2022

(30) Foreign Application Priority Data

Dec. 21, 2020  (KR) ........................ 10-2020-0180213

(51) Int. Cl.
*H04W 12/06* (2021.01)
*H04W 8/20* (2009.01)
*H04W 12/45* (2021.01)

(52) U.S. Cl.
CPC ............. *H04W 12/06* (2013.01); *H04W 8/20* (2013.01); *H04W 12/45* (2021.01)

(58) Field of Classification Search
None
See application file for complete search history.

(56) References Cited

U.S. PATENT DOCUMENTS

| | | | | |
|---|---|---|---|---|
| 2009/0291712 A1* | 11/2009 | Park | ........................ | H04B 1/401 |
| | | | | 455/558 |
| 2016/0210179 A1* | 7/2016 | Hans | ........................ | G06F 9/546 |

FOREIGN PATENT DOCUMENTS

| | | |
|---|---|---|
| CN | 105873021 B | 6/2019 |
| KR | 10-1013817 B1 | 2/2011 |
| KR | 10-1531068 B1 | 6/2015 |

OTHER PUBLICATIONS

International Search Report and Written Opinion of the International Searching Authority in connection with International Application No. PCT/KR2021/019417 issued Mar. 24, 2022, 8 pages.

(Continued)

*Primary Examiner* — Frantz Bataille

(57) ABSTRACT

The disclosure relates to communication techniques for merging 5th generation (5G) communication systems with internet-of-things (IoT) technology to support a high data transmission rate in post-4th generation (4G) system and systems therefor. The disclosure can be applied to an intelligent service (for example, smart home, smart building, smart city, smart car or connected car, health care, digital education, retail, security and safety-related services, and the like) on the basis of a 5G communication technology and an IoT-related technology. The disclosure may be applied to a technology of managing connections between a terminal supporting a multi-subscriber identity module (multi-SIM) equipped with a smart secure medium and a plurality of activated telecom bundles, and connections between the terminal supporting the multi-SIM and a plurality of profiles in a single telecom bundle.

20 Claims, 22 Drawing Sheets

(56) References Cited

OTHER PUBLICATIONS

ETSI TS 103 666-1 V15.0.0 (Nov. 2019); Technical Specification; Smart Secure Platform (SSP); Part 1: General characteristics (Release 15); 147 pages.

International Standard; ISO/IEC 7816-3, "Identification cards—Integrated circuit cards—Part 3: Cards with contacts—Electrical interface and transmission protocols" Third Edition, Nov. 1, 2006, 58 pages.

GlobalPlatform Technology, "VPP—Concepts and Interfaces" Version 1.0, Public Release, Mar. 2018, Document Reference: GPC_FST_142, 94 pages.

* cited by examiner

METHOD AND APPARATUS TO MANAGE AUTHENTICATION AND SUBSCRIPTION INFORMATION IN WIRELESS COMMUNICATION SYSTEM

CROSS-REFERENCE TO RELATED APPLICATION

This application is based on and claims priority under 35 U.S.C. § 119 to Korean Patent Application No. 10-2020-0180213, filed on Dec. 21, 2020, in the Korean Intellectual Property Office, the disclosure of which is herein incorporated by reference in its entirety.

BACKGROUND

1. Field

The disclosure relates to a method and apparatus for managing authentication and subscription information in a wireless communication system.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 70 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

Wireless communication technologies have been developed mainly for human services, such as voice, multimedia, and data communication. As 5th-generation (5G) communication systems are commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (pec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

Meanwhile, a multi-subscriber identity module (multi-SIM) terminal capable of accessing a plurality of networks is becoming common. A modulator/demodulator (MODEM) of the multi-SIM terminal may independently access networks of a plurality of mobile communication providers at the same time by using a plurality of SIMS or a plurality of universal subscriber identity modules (USIMs), and thus improved user experience may be provided to a user. For example, in the MODEM of the multi-SIM terminal, one SIM may be used exclusively for calls and the other SIM may be used exclusively for a data communication, or a plurality of SIMS may be used instead of roaming service when moving between countries/regions to provide an optimized mobile communication service in a corresponding country/region.

The multi-SIM terminal may include a plurality of universal integrated circuit cards (UICCs) or embedded UICCs (eUICCs). Alternatively, a smart secure platform (SSP) terminal may support a multi-SIM by activating a plurality of telecom bundles.

Accordingly, studies considering various technical issues between a plurality of UICCs, a plurality of eUICCs, or a plurality of telecom bundles installed in an SSP and a multi-SIM terminal or a MODEM of the multi-SIM terminal are being actively conducted.

SUMMARY

An aspect of various embodiments of the disclosure is to provide a method and apparatus for managing authentication and subscription information in a wireless communication system.

Another aspect of various embodiments of the disclosure is to provide a method and apparatus for activating a telecom bundle and connecting the same to a modulator/demodulator (MODEM) in a wireless communication system.

Still another aspect of various embodiments of the disclosure is to provide a method and apparatus for managing a telecom bundle and a telecom profile of a smart secure platform in a wireless communication system.

Still another aspect of various embodiments of the disclosure is to provide a method and apparatus for activating a telecom bundle (or a communication bundle) included in a terminal and connecting the same to a MODEM in a wireless communication system.

Still another aspect of various embodiments of the disclosure is to provide a method and apparatus for connecting a MODEM and a profile in a terminal in which a plurality of profiles are installed in one telecom bundle, and the plurality of profiles are simultaneously activated and available.

According to embodiments of the disclosure, a method performed by a terminal in a wireless communication system is provided, and the method comprises activating a first bundle of a smart secure medium connected to the terminal, forming, between the activated first bundle and a MODEM of the terminal, a first application protocol data unit (APDU) pipe used for transferring, to a first secure-related entity within the activated first bundle, a command for controlling the smart secure medium, and forming, between the activated first bundle and the MODEM, a second APDU pipe used for transferring an APDU through a first smart secure medium port which is an interface between the smart secure medium and the MODEM.

According to embodiments of the disclosure, a terminal in a wireless communication system is provided, and the terminal comprises a transceiver, and a controller connected to the transceiver, wherein the controller is configured to: activate a first bundle of a smart secure medium connected to the terminal, form, between the activated first bundle and a MODEM of the terminal, a first APDU pipe used for transferring, to a first secure-related entity within the activated first bundle, a command for controlling the smart secure medium, and form, between the activated first bundle and the MODEM, a second APDU pipe used for transferring an APDU through a first smart secure medium port which is an interface between the smart secure medium and the MODEM.

A method of the disclosure according to an exemplary embodiment comprises activating a telecom bundle installed in an SSP according to a user's request, and activating the telecom bundle includes identifying an iSIM port and a telecom bundle to be activated according to the user's request, activating the telecom bundle by using an identified telecom bundle identifier and iSIM port identifier, and connecting the activated telecom bundle to a specific SIM port of a MODEM.

In addition, connecting the telecom bundle and the MODEM of the disclosure according to an exemplary embodiment comprises connecting the telecom bundle and the MODEM based on an identifier of a pipe connected between the telecom bundle and the MODEM and an iSIM port identifier of the MODEM, or connecting the telecom bundle and the MODEM based on an identifier of a gate used for forming a pipe between the telecom bundle and the MODEM and the iSIM port identifier of the MODEM.

In addition, connecting the MODEM and a profile within the telecom bundle of the disclosure according to an exemplary embodiment comprises generating an additional pipe between the MODEM and the telecom bundle, and allocating the additional pile for the purpose of the profile.

In addition, activating the telecom bundle of the disclosure according to an exemplary embodiment comprises generating a separate pipe for the purpose of managing the telecom bundle.

A method of a terminal including a smart secure medium according to various embodiments of the disclosure comprises activating a first communication bundle of the smart secure medium, forming a first APDU pipe between the activated first communication bundle and a MODEM of the terminal, and mapping the formed first APDU pipe and a first SIM port of the MODEM, and the first SIM port may be associated with a first logical baseband.

A method of a terminal including a smart secure medium according to various embodiments of the disclosure comprises activating a first communication bundle of the smart secure medium, forming a second APDU pipe between the activated first communication bundle and a MODEM of the terminal, and mapping the formed second APDU pipe and a second SIM port of the MODEM, and the second SIM port may be associated with a management function of the first communication bundle.

A method of a terminal including a smart secure medium according to various embodiments of the disclosure comprises activating a first communication bundle of the smart secure medium, forming a third APDU pipe between the activated first communication bundle and a MODEM of the terminal, and mapping the formed third APDU pipe and a third SIM port of the MODEM, the third SIM port may be associated with a second logical baseband of the first communication bundle, and the third SIM port may be associated with a first eSIM port of the first communication bundle.

The technical problems to be achieved in the disclosure are not limited to the technical problems mentioned above, and other technical problems not mentioned will be clearly understood by those of ordinary skill in the art to which the disclosure belongs from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
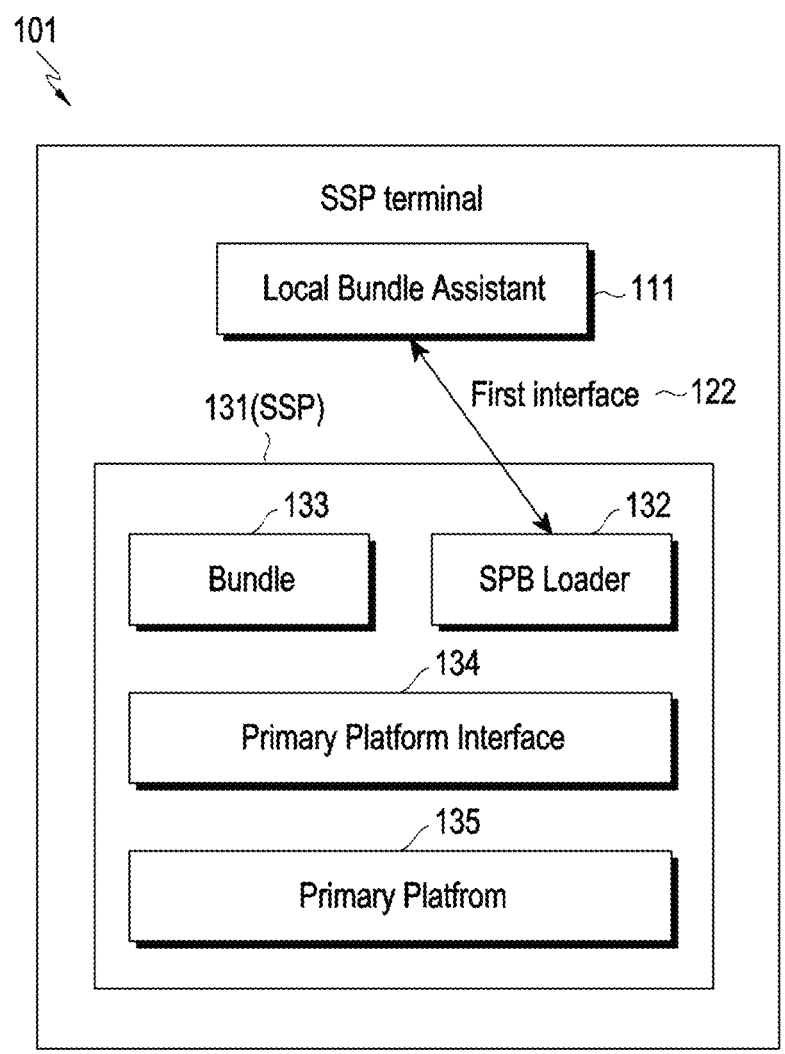
FIG. 1 is an exemplary diagram illustrating an interface between internal components of an SSP terminal according to various embodiments of the disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

The disclosure relates to a method and a device for activating a communication bundle in a terminal including a smart security medium and a modulator/demodulator (MODEM) supporting a multi-SIM function, and connecting the activated communication bundle to the MODEM. More specifically, the disclosure relates to a method for connecting the activated communication bundle to a specific SIM port of the MODEM to access a network by using a specific logical base band in the MODEM.

The disclosure provides a method for activating a telecom bundle (communication bundle) included (installed) in an SSP terminal and connecting the activated bundle to a MODEM according to an illustrative embodiment. Specifically, the disclosure provides a method for specifying, when a MODEM supports multiple SIMs, a specific port among multiple ports and activating a telecom bundle.

In addition, the disclosure is to activate a specific bundle upon a user's demand and allow access to a network by using a specific radio access technology when multiple basebands to a MODEM supporting multiple SIMS have different radio access technology (RAT) capabilities.

An aspect of various embodiments of the disclosure is to provide a method and apparatus for managing authentication and subscription information in a wireless communication system.

Another aspect of various embodiments of the disclosure is to provide a method and apparatus for activating a telecom bundle and connecting the same to a MODEM in a wireless communication system.

Still another aspect of various embodiments of the disclosure is to provide a method and apparatus for managing a telecom bundle and a telecom profile of a smart secure platform in a wireless communication system.

Still another aspect of various embodiments of the disclosure is to provide a method and apparatus for activating a telecom bundle (or a communication bundle) included in a terminal and connecting the same to a MODEM in a wireless communication system.

Still another aspect of various embodiments of the disclosure is to provide a method and apparatus for connecting a MODEM and a profile in a terminal in which a plurality of profiles are installed in one telecom bundle, and the plurality of profiles are simultaneously activated and available.

Various embodiments of the disclosure provide a method of activating and connecting a plurality of telecom bundles installed in an SSP terminal in consideration of a function of a multi-SIM MODEM in a wireless communication system.

The disclosure provides a method of managing a gate, a pipe, and an integrated SIM (iSIM) port of a MODEM in an SSP terminal for activating a plurality of telecom bundles through the disclosed embodiment in order to support a multi-SIM in the SSP terminal.

The disclosure provides a method for managing a gate, a pipe, and an iSIM port involved in a communication between a MODEM and a profile in a terminal which supports a telecom bundle having a function which may simultaneously activate a plurality of profiles.

The disclosure provides a method of generating a separate management iSIM port to manage a telecom bundle capable of simultaneously activating a plurality of profiles, and additionally generating and managing a pipe which corresponds to the management iSIM port.

The disclosure provides an example of a user interface (UI) that allows a user of a multi-SIM terminal to conveniently use communication lines available in the multi-SIM terminal without needing to know whether information about the communication lines is in a form of a telecom bundle or in a form of a profile. The disclosure provides a method for terminal software to handle a user's request by activating a telecom bundle or profile in an appropriate iSIM port when the user selects a specific communication line through the provided UI.

In various embodiments of the disclosure, it should be understood that the term "include" or "comprise" also includes terms such as "equip," "mount," "embed," and/or the like.

A MODEM of a conventional terminal including a universal integrated circuit card (UICC), embedded UICC (eUICC), and/or the like is connected to the UICC or eUICC through an ISO 7816-3 interface. However, like an integrated SSP (iSSP) or an integrated eUICC, if a secure medium is embedded in a communication processor (CP) system-on-chip (SoC), the MODEM and the secure medium may not be connected through the ISO 7816-3 interface, so a different scheme for connecting the MODEM of the terminal and the secure medium is required.

Various embodiments of the disclosure provides a connection scheme between a MODEM and a secure medium which is based on a host controller interface (HCI) and which may be an interface between the secure medium and the MODEM of an iSSP or integrated eUICC terminal.

Specific terms used in the description below are provided to assist in the understanding of the disclosure, the use of the specific terms may be changed to a different form within a range without departing from the technical spirit of the disclosure.

(1) Secure Medium (SE, eSE, UICC, eUICC, and SSP)

In various embodiments of the disclosure, a secure medium may include, for example, at least one of a secure element (SE), an embedded secure element (eSE), a UICC, an eUICC, and an SSP.

In various embodiments of the disclosure, the SE means a secure module including a single chip which may store secure information (e.g., a mobile communication network access key, user identify identification information such as an identification card/passport, and/or the like, credit card information, an encryption key, etc.), and include and operate a control module (e.g., a network access control module such as a universal subscriber identity module (USIM), an encryption module, a key generation module, etc.) using the stored secure information.

In various embodiments of the disclosure, the SE may be used in various electronic devices (e.g., a smart phone, a tablet, a wearable device, a vehicle, an Internet of Things (IoT) device, etc.), and provide a secure service (e.g., a mobile communication network access, payment, user authentication, etc.) through the secure information and the control module. The SE may be used as a term collectively referring to a UICC, an eSE, and a smart secure platform (SSP) into which the UICC and the eSE are integrated. A form of the SE may be divided into a removable SE, an embedded SE, and an integrated SE which is integrated into a specific element or an SoC, according to a form in which the SE is connected to or installed in an electronic device.

In various embodiments of the disclosure, the eSE means an SE which is embedded and fixed to the electronic device and used. Normally, the eSE may be manufactured for a manufacturer upon a terminal manufacturer's request, and may be manufactured to include an operation system (OS) and a framework. The eSE may remotely download and install an applet-type service control module, and may be used for various secure services such as an electronic wallet, ticketing, an electronic passport, a digital key, and/or the like. In various embodiments of the disclosure, an SE in a form of a single chip attached to an electronic device, the SE capable of remotely downloading and installing a service control module, is referred to as an eSE.

In various embodiments of the disclosure, a UICC refers to a smart card inserted into and used in a mobile communication terminal, and/or the like. The UICC may include an access control module for accessing a network of a mobile communication provider. The access control module may include, for example, a USIM, a subscriber identity module (SIM), an Internet Protocol (IP) multimedia service identity module (ISIM), and/or the like. A UICC including a USIM is generally referred to as a USIM card. Likewise, a UICC including a SIM is generally referred to as a SIM card.

The SIM may be included in a UICC when the UICC is manufactured, or the SIM of a mobile communication service that a user desires to use at desired time may be downloaded in the UICC. The UICC may also download and install a plurality of SIMs, and may select and use at least one of the plurality of SIMs. The UICC may be fixed to the terminal and used or may be used in a removable form, according to a form factor.

A UICC embedded in a terminal as a chip form and used is an eUICC, and particularly, a UICC embedded in an SoC including a communication processor (CP), an application processor (AP), or a single processor into which the CP and the AP are integrated may also be referred to as an integrated UICC (iUICC). Normally, an eUICC and an iUICC may be fixed to and used in a terminal, and access a network service of a mobile communication provider network by remotely downloading a SIM in the eUICC or the iUICC. The eUICC or the iUICC may be included in a specific SIM embedded therein at the time of manufacturing, and may be embedded in a terminal. A form in which SIM information which is downloaded in the eUICC and used and authentication information for receiving a network service and information included in a USIM application are packaged in a software form may be an eUICC profile. The eUICC profile may be called an eSIM profile, an iUICC profile, or a USIM profile, or may be more simply called a profile.

In various embodiments of the disclosure, a smart secure medium, e.g., a smart secure platform (SSP) is a secure module capable of supporting functions of an UICC and an eSE in a single chip. The SSP may be classified into a removable SSP (rSSP), an embedded SSP (eSSP), and an integrated SSP (iSSP) embedded in an SoC of a terminal. The SSP may include one primary platform (PP) and at least one secondary platform bundle (SPB) which operates on the PP. The PP may include at least one of a hardware platform and a low-level operating system (LLOS), and the SPB may include at least one of a high-level operating system (HLOS) and an application which operates on the HLOS.

In various embodiments of the disclosure, the SPB is driven on the PP of the SSP by using a resource of the PP, and for example, a UICC bundle may be a form in which an application, a file system, an authentication key value, and/or the like, stored in an existing UICC and an OS, e.g., an HLOS, in which the application, file system, the authentication key value, and/or the like operate are packaged in a software form. In various embodiments of the disclosure, it may be noted that an "SPB" may be simply referred to as a "bundle."

A bundle may access a resource in a central processing unit (CPU), a memory, and/or the like of a PP through a primary platform interface (PPI), and may be operated on the PP through this. A communication application such as a SIM, a USIM, an ISIM, and/or the like may be included in the bundle, and various applications such as an electronic wallet, ticketing, an electronic passport, a digital key, and/or the like may be included in the bundle.

An SSP may be used for UICC or eSE purposes according to a bundle remotely downloaded and installed, and may be used for the UICC and eSE purposes by installing a plurality of bundles in a single SSP and simultaneously operating the plurality of bundles. For example, if a bundle including a profile operates, an SSP may be used for UICC purposes to access a network of a mobile communication provider. The corresponding UICC bundle may operate by remotely downloading at least one profile, and select and operate one of the remotely-downloaded at least one profile, as with an eUICC or an iUICC. For example, if a bundle including a service control module including an application capable of providing a service such as an electronic wallet, ticketing, an electronic passport, or a digital key, and/or the like operates on the SSP, the SSP may be used for eSE purposes.

A plurality of service control modules may be integrally installed and operated in one bundle, or may be installed and operated in independent bundles. An SSP may be used by downloading and installing a bundle to be operated on the SSP in an external bundle management server, e.g., a secondary platform bundle manager (SPB manager) by using an over-the-air (OTA) technology. A method of downloading and installing a bundle by using an OTA technology in an SSP is equally applicable to an rSSP detachably inserted into a terminal, an eSSP embedded in the terminal, and an iSSP included in a SoC installed in the terminal.

In various embodiments of the disclosure, a telecom bundle may be a bundle which includes at least one network access application (NAA), or includes a function of capable of remotely downloading and installing at least one NAA. Here, the NAA is a module for accessing a network stored in a UICC, and may be a USIM or an ISIM. The telecom bundle may include a telecom family identifier indicating a telecom family.

In various embodiments of the disclosure, an eSIM bundle may be a bundle which has an eUICC OS driven therein and installs a profile in a terminal to operate a network service by performing the same function as an eUICC. The eSIM bundle may also be referred to as a Remote SIM Provisioning (RSP) bundle in consideration of the name of an RSP which is a major function of an eSIM. In various embodiments of the disclosure, the eSIM bundle may include a telecom family identifier indicating the eSIM bundle.

In the specification, an application protocol data unit (APDU) may be a message for a terminal or a controller in a device to interwork with an eUICC. The APDU is a pair of a command and a response, and an APDU command and an APDU response are defined in ETSI 102.221 with reference to ISO 7816. As defined in ETSI 102.221, the APDU command includes a class of instruction (CLA), instruction (INS), an instruction parameter 1 (P1), and an instruction parameter 2 (P2) as a header of the APDU, and includes Lc (number of bytes in a command data field), data, Le (number of bytes expected in response of the command) as a body of the APDU, the APDU response includes an optional data field, SW1 (status byte 1), and SW2 (status byte 2), and a detailed description thereof refer to the ETSI 102.221 standard.

In various embodiments of the disclosure, a profile package may be used interchangeably with a profile or may be used as the term representing a data object of a specific profile, and may be referred to as a profile tag, length, value (TLV) or a profile package TLV. A profile identifier may be indicated as an integrated circuit card identifier (ICCID) as a unique identification number of the profile. If the profile package is encrypted by using an encryption parameter, the profile package may be referred to as a protected profile package (PPP) or a protected profile package TLV (PPP TLV). If the profile package is encrypted by using an encryption parameter which may be decrypted by only a specific eUICC, the profile package may be referred to as a bound profile package (BPP) or a bound profile package TLV (BPP TLV). The profile package TLV may be a data set expressing information included in the profile in a TLV format.

In various embodiments of the disclosure, an authentication algorithm may be used, for example, an authentication and key agreement algorithm may be used. AKA may represent an authentication algorithm for accessing a 3rd Generation Partnership Project (3GPP) network and a 3rd Generation Partnership Project 2 (3GPP2) network. K may be an encryption key value used in the AKA authentication algorithm and stored in an eUICC, and in various embodiments of the disclosure, OPc may be a parameter value used in the AKA authentication algorithm and stored in the eUICC.

In various embodiments of the disclosure, an NAA may be stored in a UICC, and may be an application program such as a USIM or an ISIM for accessing a network. In various embodiments of the disclosure, the NAA may be a network access module.

M various embodiments of the disclosure, an eSIM port represents a virtual logical interface used by multiplexing physical interfaces connected between an eUICC and a MODEM, and may be used interchangeably with a port, a SIM port, a logical interface, and a virtual interface.

In various embodiments of the disclosure, a function of activating and managing a plurality of profiles existing in a single eUICC may be referred to as a multiple enabled profile (MEP) function. An existing eUICC may activate only up to one profile, so it is impossible to support a multi-SIM function if one eUICC is used. Therefore, in order to support the multi-SIM function with a single eUICC, there is a need for a function in which a plurality of profiles are activated in the single eUICC and the activated plurality of profiles are managed, and this function is the MEP function. An eUICC in which the MEP function is implemented may be referred to as an MEP-supported eUICC. A terminal including a MODEM in which the MEP function is implemented and terminal software capable of supporting the MEP function may be referred to as an MEP-supported terminal.

In various embodiments of the disclosure, an MEP eSIM bundle or an MEP RSP bundle may represent an eSIM bundle supporting an MEP function among telecom bundles. The MEP eSIM bundle may be referred to as an MEP RSP bundle. The MEP eSIM bundle may simultaneously activate a plurality of profiles in a multi-SIM terminal.

In various embodiments of the disclosure, a telecom package may be a term representing one profile or one telecom bundle. The telecom package may be a term representing a communication line subscribed by a user through the one profile or the one telecom bundle. One telecom package may access a network through one logical base band in a MODEM. A service provider may provide the one telecom package for the user's communication service subscription.

In various embodiments of the disclosure, a secondary platform bundle loader (SPBL) may be a term representing a management bundle for performing a management operation such as installing, activating, deactivating, and deleting another bundle in an SSP, and/or the like. In various embodiments of the disclosure, for convenience of description, the SPBL may be simply referred to as a loader. A local bundle assistant (LBA) of a terminal or a remote server may install, activate, deactivate, or delete a specific bundle through the loader. In various embodiments of the disclosure, it may be noted that the loader may be also referred to as an SSP.

(2) Terminal and LBA

In various embodiments of the disclosure, a terminal may be referred to as a mobile station (MS), a user equipment (UE), a user terminal (UT), a wireless terminal, an access terminal, a device, a subscriber unit, a subscriber station, a wireless device, a wireless communication device, a wireless transmit/receive unit (WTRU), a mobile node, a mobile, or other terms. Various embodiments of the terminal include a cellular telephone, a smart phone having a wireless communication function, a personal digital assistant (PDA) having a wireless communication function, a wireless MODEM, a mobile computer having a wireless communication function, a photographing device such as a digital camera having a wireless communication function, a gaming device having a wireless communication function, music storage and playback home appliances having a wireless communication function, and Internet home appliances capable of wireless Internet access and browsing, and may further include portable units or terminals in which combinations of such functions have been integrated. Furthermore, the terminal may include a machine to machine (M2M) terminal and a machine type communication (MTC) terminal/device, but is not limited thereto. In various embodiments of the disclosure, it may be noted that the terminal may be called an electronic device.

In various embodiments of the disclosure, an SSP which may download and install a bundle may be embedded in a terminal. In addition, the SSP physically separately from the terminal may be inserted into a slot which may include the SSP in the terminal and then be connected to the terminal. For example, the SSP may be inserted into the terminal in a form of a card. In this case, a separate SSP may be equipped with the terminal including the SSP. In various embodiments of the disclosure, the terminal including the SSP may be referred to as an SSP terminal.

In various embodiments of the disclosure, an LBA means software or an application which is installed in a terminal and may control an SSP. The LBA may transfer, to the SSP, a management command such as a command for downloading a bundle in the SSP, or activating, deactivating, or deleting a bundle preinstalled in the SSP, and/or the like. The terminal may include a local profile assistant (LPA) which is software or an application installed in the terminal to control an eUICC. In various embodiments of the disclosure, the LPA may be implemented to be included in a subcomponent of the LBA, and may be included in the terminal in a form of an application separate from the LBA. In various embodiments of the disclosure, the LPA may be software or an application which may control an eSIM bundle which is functionally similar to the eUICC, among bundles installed in the SSP in the terminal.

(3) Bundle Management

In various embodiments of the disclosure, bundle management may be a term including changing a state (e.g., activation, deactivation, or deletion) of bundles installed in an SSP, metadata update of the bundles installed in the SSP, obtainment of a list of the bundles installed in the SSP, installing of a bundle in the SSP, and/or the like.

The bundle management may be divided into local bundle management (LBM) and remote bundle management.

An LBM may mean an operation which is performed through direct use of an SSP terminal and manages an SSP and a bundle installed in the SSP through software in an SSP terminal. The LBM may be also called bundle local management and local management. An LBA which is terminal software of the SSP terminal may transfer, to the SSP, a local bundle management command including information related to a bundle subject to local bundle management and a specific operation to be performed. In various embodiments of the disclosure, the local bundle management command may be called a local management command and a local command.

A local bundle management package (LBM package) may include one or more local bundle management commands transferred from an LBA which is terminal software to an SPBL. The LBM package may be also called a bundle local management package, a local management package, a local management command package, and a local command package.

A user of the SSP terminal may perform LBM through an LBA installed in the SSP terminal, software which has a right to access an SSP, and/or the like. An operation which may be performed through the LBM may include an operation of changing a state (e.g., enabled, disable, or deleted) of a target bundle, or updating partial information or value of the target bundle, and/or the like. The operation of updating the partial information or value may be an operation of updating information in bundle metadata. The target bundle may be used as a term indicating a bundle subject to the LBM.

In various embodiments of the disclosure, remote bundle management (RBM) may mean an operation which is performed by a command transferred by an external server, e.g., a service provider, a remote management server, a bundle management server (an SPB manager), and/or the like, and manages an SSP and a bundle installed in the SSP through software in an SSP terminal. The RBM may be also called bundle remote management and remote management.

In various embodiments of the disclosure, a service provider or a terminal owner (a device owner) may generate a remote bundle management command including information about a bundle subject to RBM and a specific operation to be performed. The remote bundle management command may be also called a remote management command and a local command. The remote bundle management command may be transferred from a bundle management server, e.g., an SPB manager to an LBA which is terminal software of an SSP terminal in which the remote bundle management command needs to be performed. The remote bundle management command may be transferred to an SPBL by the LBA which is the terminal software of the SSP terminal, and bundle management may be performed according to the detail of the command in the SPBL.

A remote bundle management package (RBM package) may include one or more remote bundle management commands which are generated by an external server, transferred from the external service to an LBA which is SSP terminal software, and transferred from the LBA which is the terminal software to an SPBL. The RBM package may be also called a bundle remote management package, a remote management package, a remote management command package, and a remote command package.

In various embodiments of the disclosure, an operation of activating (enabling) a bundle by a terminal or an external server may mean an operation of changing a state of a corresponding profile to an activated (enabled) state and making configuration so that the terminal may receive a service (e.g., a communication service through a communication provider, a credit card payment service, a user authentication service, etc.) provided by a corresponding bundle. A bundle in an activated state may be also expressed as an "activated bundle (enabled bundle)." The bundle in the activated state may be stored in an encrypted state in a storage inside or outside an SSP. In various embodiments of the disclosure, a state of the activated bundle, e.g., an activated SPB, may be changed to an active state according to a bundle external input (e.g., a user input, a push, a request from an application in the terminal, an authentication request from a commutation provider, a PP management message, etc.) or an internal operation of the bundle (e.g., timer or polling). A bundle in an active state may mean being loaded in an active memory in the SSP from a storage inside or outside the SSP, processing secure information by using a secure control device, e.g., a secure CPU in the SSP, and providing a secure service to the terminal.

In various embodiments of the disclosure, an operation of deactivating (disabling) a bundle by a terminal or an external server may mean an operation of changing a state of the corresponding bundle to a deactivated (disabled) state and making configuration so as to refrain the terminal from receiving a service provided by the corresponding bundle. A profile in the deactivated state may be expressed as a "deactivated bundle (disabled bundle)," e.g., a "deactivated SPB." The bundle in the deactivated state may be stored in an encrypted state in a storage inside or outside an SSP.

(4) Si2 Interface and Si3 Interface

In various embodiments of the disclosure, a function invoked by an LBA may be a function performed in an Si2 interface which is an interface between the LBA and an SPB manager and an Si3 interface which is an interface between the LBA and an SPBL. The LBA may transfer a parameter to the SPB manager or the SPBL through a specific function. Parameters transferred from the LBA through invoking of the specific function may be referred to as a function command or a command of the specific function. The SPB manager or the SPBL receiving the function command may perform a specific operation according to the function command and may transmit a response to the function command. The response may include parameters. Transferring of the function command through an Si2 interface may use a hypertext transfer protocol (HTTP). Specifically, transferring of the function command through the Si2 may use an HTTP POST request message of the HTTP, and the function command may be included in a body part of the HTTP POST request message.

(5) APDU Pipe Formation

An APDU pipe is a pipe formed between two hosts for an APDU communication. The APDU pipe is formed between a UICC APDU application gate of one host and a UICC APDU service gate of another host. A process of forming the APDU pipe between two hosts may be performed with reference to ETSI TS 102 622 which is a host controller interface (HCI) standard and ETSI TS103 666-1 and ETSI TS 103 666-2 which are SSP/iSSP standards.

In various embodiments of the disclosure, the APDU pipe may be also called a UICC pipe, a UICC APDU pipe, etc.

In various embodiments of the disclosure, the UICC application gate may be also called a UICC application gate.

In various embodiments of the disclosure, the UICC APDU service gate may be also called a UICC service gate.

(6) HCI Configuration

An HCI defines an interface between hosts. The HCI may follow definition in ETSI TS 102 622 (smart card, UICC—contactless front-end (CLF) interface); host controller interface (HCI) standard.

The HCI may include a gate for exchanging a command, a response, and an event, a mechanism for transferring a host controller protocol (HCP) message, and an HCP routing mechanism.

In various embodiments of the disclosure, a host may be a logical entity in which one or more services are operated. A service may be a set of a series of functions performing a specific function as a set of atomic functions.

In various embodiments of the disclosure, a gate may be an entry point which is a commutation entry of one service operating in a host.

In various embodiments of the disclosure, a gate for management of a host network may be called a management gate.

In various embodiments of the disclosure, a network controller host and all hosts in an iSSP may include an administration gate.

In various embodiments of the disclosure, a network controller host and all hosts in an iSSP may include one link management gate.

In various embodiments of the disclosure, a network controller host and all hosts in an iSSP may include an identity management gate.

In various embodiments of the disclosure, a network controller host and all hosts in an iSSP may include one loop back gate.

In various embodiments of the disclosure, a network controller host and all hosts in an iSSP may include one or more generic gates.

In various embodiments of the disclosure, a pipe is a logical communication channel formed between two gates of different hosts.

In various embodiments of the disclosure, each of a host, a gate, and a pipe may have an identifier, and identifiers of the host, the gate, and the pipe may be called a host identifier (host ID), a gate identifier (gate ID), and a pipe identifier (pipe ID), respectively.

In various embodiments of the disclosure, a host identifier may have a fixed identifier as below.

For example, host controller identifier: "00," terminal host identifier: "01," and UICC host identifier: "02."

Identifier values "80" to "BF" may be dynamically assigned to hosts by an entity for managing a host identifier in an iSSP or a network host controller.

In various embodiments of the disclosure, a gate identifier may be used for identifying a type of a gate.

In various embodiments of the disclosure, a pipe identifier may have a 7-bit length. The pipe identifier may be used as a header of an HCP packet and may be used for packet routing in an iSSP.

For example, a host identifier in a telecom bundle in an iSSP may have UICC host identifier "02," but may have another value.

In various embodiments of the disclosure, identifiers of other hosts in an iSSP may be assigned by a host controller or a network controller host.

(7) Multi-SIM MODEM

A multi-SIM MODEM may support a plurality of logical basebands, and support a multi-SIM multi-standby (MSMS) or multi-SIM multi-active (MSMA) terminal. An example of the MSMS may include dual-SIM dual-standby (DSDS) supporting a dual-SIM function with two SIM cards. The MSMS and the MSMA are in common in that a MODEM supports a plurality of logical basebands. The MSMS differs from the MSMA in that in a case of the MSMA, a plurality of transceivers support a network access to a plurality of networks which are completely separated from each other, but in a case of the MSMS, one transceiver shares a plurality of logical basebands with a time division multiplexing scheme to support a network access to the plurality of networks.

In various embodiments of the disclosure, one logical baseband may mean a network protocol stack which may perform a network access to a network (for example, a 3GPP network) based on one communication subscriber identifier information (for example, authentication information of an SIM). Digital information through a logical baseband may be modulated and the modulated digital information is transmitted through a transceiver as an analog signal form. An analog signal received through a transceiver is converted and modulated into a digital signal, and the digital signal may be decoded through a local baseband.

In various embodiments of the disclosure, according to a performance of a MODEM, a logical baseband may support, for example, GSM, 3G, 4G LTE, and 5G, and a plurality of logical basebands of a multi-SIM MODEM may support a cellular commutation at the same level (e.g., the plurality of logical basebands support only up to 4G LTE, or all of the plurality of logical basebands support 5G), or may support cellular networks at different levels (e.g., among the plurality of logical basebands, one logical baseband supports 5G, and another logical baseband supports up to 4G LTE).

In various embodiments of the present disclosure, a multi-SIM MODEM may be connected to a plurality of physical SIMS, an eUICC, and a telecom bundle. The multi-SIM MODEM may include SIM ports, and the number of SIM ports is greater than or equal to the number of SIMs which the multi-SIM MODEM may support at the same time. In general, the number of SIMs which may be simultaneously supported by the multi-SIM MODEM may be related to the number of logical basebands which may be simultaneously supported by the multi-SIM MODEM. If the multi-SIM MODEM supports an MEP RSP bundle, the multi-SIM MODEM may include a separate SIM port for management for managing the MEP RSP bundle. This SIM port for management may be set to be accessible only by terminal software having authority to manage the MEP RSP bundle. In particular, a SIM port of a multi-SIM MODEM in an iSSP may be referred to as an iSIM port (iSSP SIM port).

The number of logical basebands which the multi-SIM MODEM may support simultaneously may be related to the number of telecom packages which the multi-SIM MODEM may support simultaneously.

In addition, an iSIM port may be seen as an independent SIM slot in a higher layer such as an OS/framework of a terminal. For example, according to the global platform open mobile API standard, the iSIM port may correspond to one card reader class. In addition, the iSIM port may be also used as a medium allowing a user in a user interface (UI) of the terminal to connect a specific bundle to a specific baseband and activate the specific bundle.

In various embodiments of the present disclosure, a multi-SIM MODEM having two independent logical basebands may have two or more iSIM ports, and likewise, a multi-SIM MODEM having an independent logical basebands may include n or more iSIM ports. For example, a multi-SIM MODEM supporting an MEP RSP bundle may support a total of 3 iSIM ports, including an iSIM port for managing the MEP RSP bundle. Similarly, a multi-SIM MODEM having an independent logical basebands may support a total of n+1 iSIM ports, including an iSIM port for MEP RSP bundle management.

In various embodiments of the present disclosure, a multi-SIM MODEM having two iSIM ports may simultaneously support two different UICCs, eUICCs, and telecom bundles, and likewise, a multi-SIM MODEM having n iSIM ports may simultaneously support n different UICCs, eUICCs, and telecom bundles. Here, the supporting means performing a network access by using authentication information within a UICC, an eUICC, and a telecom bundle to provide a communication service.

In describing the disclosure, when it is determined that a detailed description for the known function or configuration related to the disclosure may obscure the gist of the disclosure, the detailed description thereof will be omitted.

FIG. 1 is an exemplary diagram illustrating an interface between internal components of an SSP terminal according to various embodiments of the disclosure.

Referring to FIG. 1, an SSP terminal 101 may include an SSP 131 and a local bundle assistant (LBA) 111 which is terminal software. In addition, the SSP terminal 101 may include a transceiver for transmitting and/or receiving a signal to and/or from another terminal, a base station, a server, and/or the like, and a controller for controlling an overall operation of the SSP terminal 101. The controller may control an operation of the SSP terminal 101 according to various embodiments of the disclosure. The controller may include at least one processor. The controller may control the SSP 131 through the LBA 111.

The SSP 131 may include a primary platform 135, a primary platform interface 134, a secondary platform bundle 133, and a secondary platform bundler loader 132. The primary platform 135 may include a hardware platform and a low-level operating system. The secondary platform bundle 133 may be simply referred to as a bundle, and the bundle includes an application and a high-level operating system (HLOS) driven on the primary platform 135. The secondary platform bundle loader 132 may be simply referred to as an SPB loader or a loader. The loader 132 is a kind of the bundle 133, and may correspond to a system bundle having a special right to manage the bundle 133 installed in the SSP 131. The terminal software LBA 111 and the loader 132 may exchange an instruction and information through a first interface 122. The first interface 122 may be referred to as an Si3 interface. The LBA 111 may be perform following operations through the first interface 122:

Obtainment of first SSP information and a SSP credential from the loader 132;

Transmission of a server credential;

Transmission of bundle data to be installed in the SSP 131, to the loader 132; and/or Management (activation, deactivation, deletion, update of bundle metadata, management of a list of installed bundles, etc.) for a bundle installed in the SSP 131.

Figure 2:
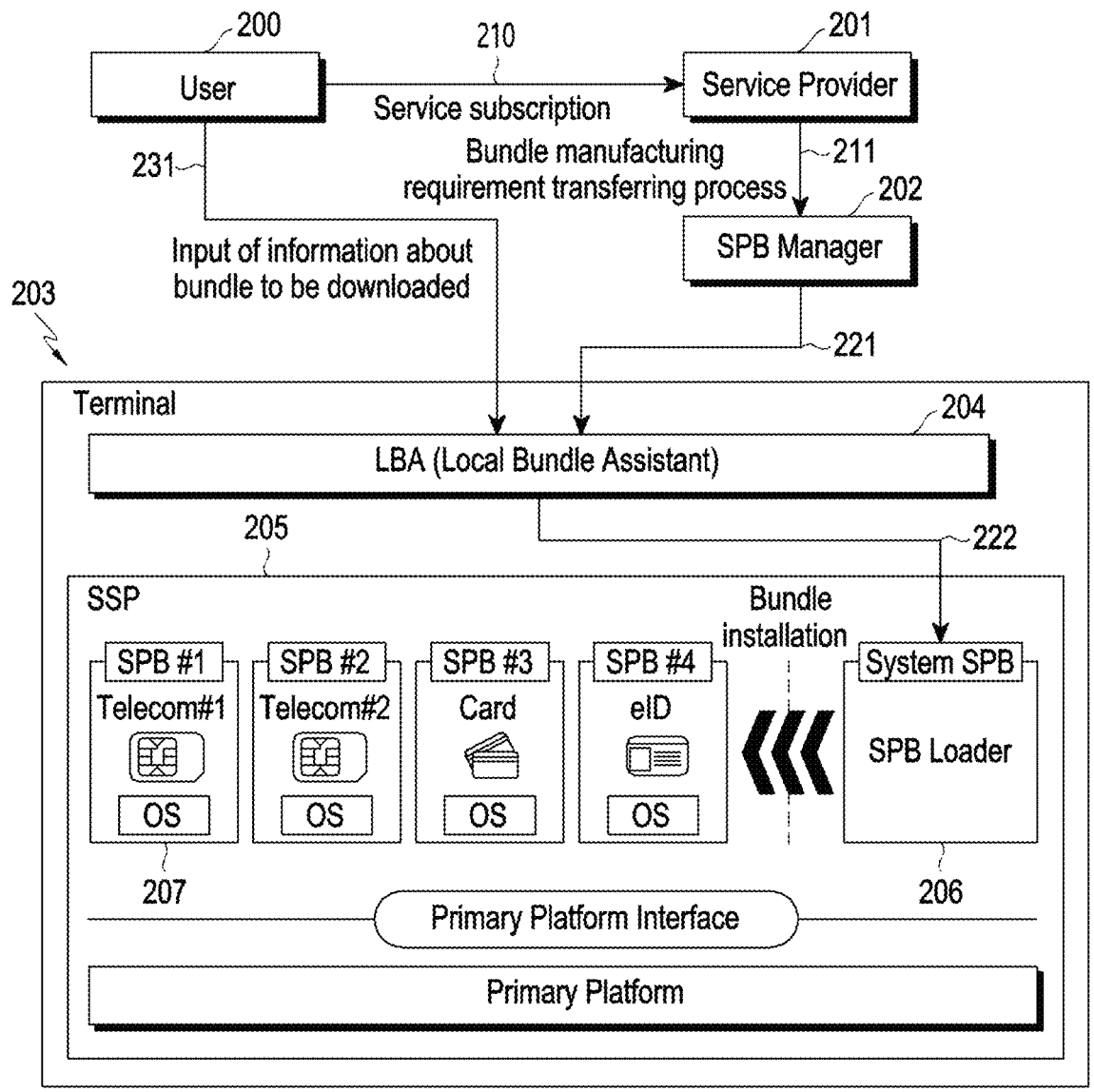
FIG. 2 is a diagram illustrating a component inside or outside a terminal for downloading a bundle by the terminal according to various embodiments of the disclosure.

FIG. 2 is a diagram illustrating a component inside or outside a terminal for downloading a bundle by the terminal according to various embodiments of the disclosure. A terminal 203 may correspond to an SSP terminal 101 in FIG. 1. An LBA 204 may correspond to an LBA 111 in FIG. 1. An SPB loader 206 may correspond to a secondary platform bundle loader 132 in FIG. 1. A bundle 207 may be a secondary platform bundle 133 in FIG. 1. The terminal 203, the LBA 204, and the SPB loader 206 are described with reference to an embodiment in FIG. 1.

According to FIG. 2, a user 200 may select and subscribe a service (e.g., a call service, a data service, and/or the like through a mobile communication network) provided by a service provider 201 in a service subscription process 210. In the service subscription process 210, the user 200 may pay the service provider 201 a predetermined amount or a subscription fee for a service, and the service provider 201 may provide the user 200 with predetermined information for installing the bundle 207 capable of receiving a service in the terminal 203 of the user. In the service subscription process 210, in order to use the service provided by the service provider 201, the user 200 may selectively transfer, to the service provider 201, an SSP identifier of an SSP 205 in the terminal 203 in which the bundler 207 is to be installed. The SSP identifier transferred to the service provider 201 in the service subscription process 210 may allow the bundle 207 purchased by the user 200 to be installed only in the SSP 205 having the corresponding SSP identifier.

According to some embodiments, in the service subscription process 210 in FIG. 2, an SSP activation code may be issued from the service provider 201 to the terminal 200 as predetermined information required to install the bundle 207 in the terminal 203. The SSP activation code may be provided as a QR code format, or may be issued with a link in a uniform resource identifier (URI) format or a string through an email, a text, or an application associated with the service provider 201. According to some embodiments, the SSP activation code provided after the user 200 subscribes to a telecom service may include an eSIM activation code allowing an eSIM profile to be downloaded instead of a telecom bundle, together with information allowing the telecom bundle to be downloaded.

In a bundle manufacturing requirement transferring process 211, the service provider 201 and an SPB manager 202 may perform a bundle download preparation procedure. In the bundle manufacturing requirement transferring process 211, the service provider 201 may selectively transfer, to the SPB manager 202, an identifier (an SSP ID) of the SSP 205 in which the bundle is to be installed, and may transfer, to the SPB manager 202, at least one of a bundle family identifier (SPB family ID) and a specific bundle identifier (SPB ID) capable of providing a service selected by a subscriber. In the bundle manufacturing requirement transferring process 211, the SPB manager 202 may select one of a bundle having the transferred specific bundle identifier and a bundle having the transferred bundle family identifier, and may transfer an identifier of the selected bundle to the service provider 201. In the bundle manufacturing requirement transferring process 211, the service provider 201 or the SPB manager 202 may newly generate a bundle matching ID which may distinguish the selected bundle. The bundle matching ID which may distinguish the bundle may be referred to as CODE_M.

In addition, the SPB manager 202 may connect the transferred SSP identifier (SSP ID) to the selected bundle to manage the same. In the bundle manufacturing requirement transferring process 211, the SPB manager 202 may transfer a bundle management server address (SPB manager address) from which the selected bundle may be downloaded, to the service provider 201. In this case, the bundle management server address may be an address of a specific or an arbitrary bundle management server in which a prepared bundle is stored, and may be an address of another bundle management server in which download information (for example, a server address, etc.) of the prepared bundle may be stored and obtained. In the bundle manufacturing requirement transferring process 211, when the service provider 201 requests preparation for the telecom bundle from the SPB manager 202, information about the eSIM profile matching to the corresponding telecom bundle may be provided together.

If a part of the bundle manufacturing requirement transferring process 211 precedes the service subscription process 210, the service provider 201 may transfer, in the service subscription process 210, prepared bundle download information to the user 200. The bundle download information may selectively transfer at least one of the bundle management server address (SPB manager address) in which the bundle is prepared, the bundle matching ID of the prepared bundle, and the bundle family identifier of the prepared bundle.

Referring to FIG. 2, in a process 231 of inputting information of a bundle to be downloaded, bundle download information may be transferred to the LBA 204 of the terminal 203. The bundle downlink information may be at least one of an address (an SPB manager address) of a bundle management server which the LBA 204 may access, a bundle identifier of a bundle prepared in the bundle manufacturing requirement transferring process 211, and a bundle family identifier of the prepared bundle. The bundle identifier may include at least one of a bundle event ID or a bundle matching ID generated in the bundle manufacturing requirement transferring process 211. In addition, the bundle identifier may include a bundle family identifier of the prepared bundle. The bundle event ID may include at least one of the bundle management server address and the bundle matching ID of the bundle prepared in the bundle manufacturing requirement transferring process 211. The bundle download information may be inputted if the user 200 inputs an SSP activation code (e.g., scan a QR code, directly input text, etc.) to the LBA 204, or may be inputted to the LBA 204 by means of a push input through an information provision server (not shown). In addition, the LBA 204 access the information provision server (not shown) preconfigured in the terminal 203 to receive the bundle download information.

The bundle download to the SSP 205 in the SPB manager 202 may be implemented as an operation and a function performed in an interface 221 between the SPB manger 202 and the LBA 204 and an interface 222 between the LBA 204 and the SPB loader 206. The interface 222 between the LBA 204 and the SPB loader 206 may correspond to a first interface 122 in FIG. 1. The interface 222 between the LBA 204 and the SPB loader 206 may be referred to as an Si3 interface.

Figure 3:
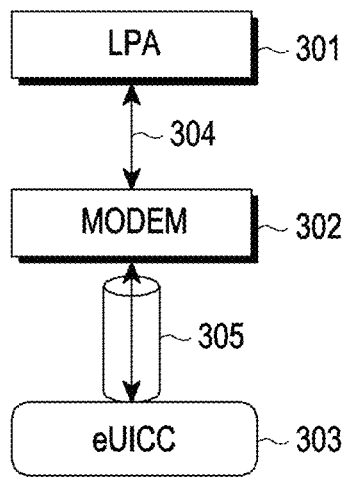
FIG. 3 is a diagram illustrating components in an eUICC terminal according to various embodiments of the disclosure.

FIG. 3 is a diagram illustrating components in an eUICC terminal according to various embodiments of the disclosure.

An LPA 301 may transmit an APDU command to an eUICC 303 and receive an APDU response therefrom. The APDU command and response correspond to data following ETSI TS 102 221 and SGP. 22 standard based on ISO 7816-4. The APDU command and response may be used for a communication between the LPA 301 and the eUICC 303 and a communication between a MODEM 302 and the eUICC 303.

The LPA 301 and the eUICC 303 may go through the MODEM 302 for APDU transmission and/or reception. The LPA 301 may transfer an APDU to be transmitted to the eUICC 303 to the MODEM 203 through a first interface 304 provided by the MODEM 302. The first interface 304 may be an interface for transferring an APDU to the MODEM 302 through a framework of the eUICC terminal or an operating system of the eUICC terminal. The first interface 304 may be an interface for containing an APDU to be transmitted by the LPA 301 in an AT command and transmitting the same to the MODEM 302. The MODEM 302 may exchange the APDU with the eUICC 303 through a second interface 305. The second interface 305 may be an ISO 7816-3 interface.

Figure 4:
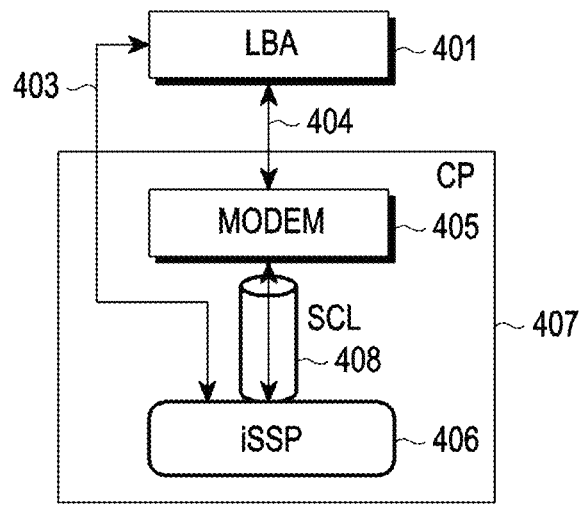
FIG. 4 is a diagram illustrating components of an iSSP terminal according to various embodiments of the disclosure.

FIG. 4 is a diagram illustrating components of an iSSP terminal according to various embodiments of the disclosure.

An iSSP terminal may be a terminal in which a MODEM 405 and an iSSP 406 are embedded in a communication processor (CP) 407.

The iSSP 406 may be collectively called a secondary platform bundler loader (SPBL) in the iSSP 406 and secondary bundles installed in the iSSP 406.

A communication between an LBA 401 and the SPBL in the iSSP 406 may be performed through a third interface 403. The third interface 403 may be called an Si3 interface. A command and a response transferred through the third interface 403 may be called an Si3 command and an Si3 response, respectively.

The LBA 401 may transfer the Si3 command to the SPBL in the iSSP 406 and may receive a response therefrom.

The LBA 401 may transmit and/or receive data to and/or from the MODEM 405 through a fourth interface 404.

The MODEM 405 and the iSSP 406 may transmit and/or receive data through a fifth interface 408. The fifth interface 408 may be an interface following an SSP common layer (SCL) defined in ETSI TS 103 666-1. An SCL transport layer may be an ETSI TS 102 622 host controller interface (HCI). The fifth interface 408 may be an APDU pipe formed between a UICC APDU application gate of the MODEM 405 and a UICC APDU service gate of a specific bundle in the iSSP 406.

Figure 5:
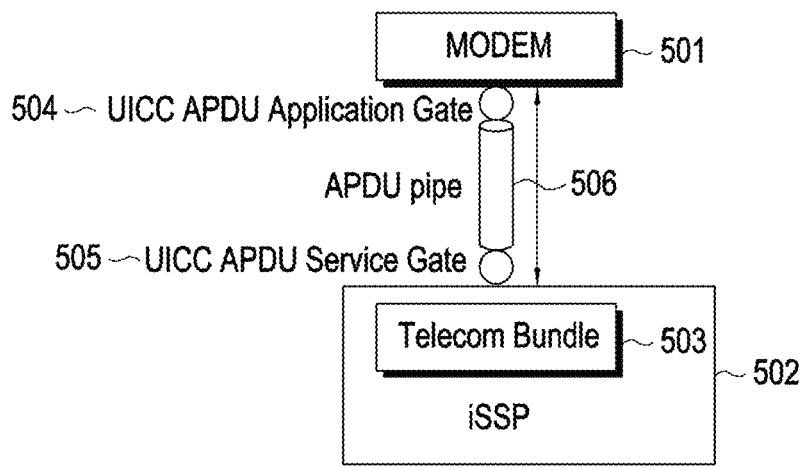
FIG. 5 is a diagram illustrating components of an interface for an APDU communication between a MODEM and a telecom bundle according to various embodiments of the disclosure.

FIG. 5 is a diagram illustrating components of an interface for an APDU communication between a MODEM and a telecom bundle according to various embodiments of the disclosure.

An APDU pipe 506 formed between a MODEM 501 and a telecom bundle 503 in FIG. 5 may be an example of a fifth interface 408 in FIG. 4.

The MODEM 501 may perform an APDU communication by forming the APDU pipe 506 with the telecom bundle 503 installed in an iSSP 502. The APDU pipe 506 may be generated while having a UICC APDU application gate 504 and a UICC APDU service gate 505 of the MODEM 501 as entries (entry points).

Figure 6:
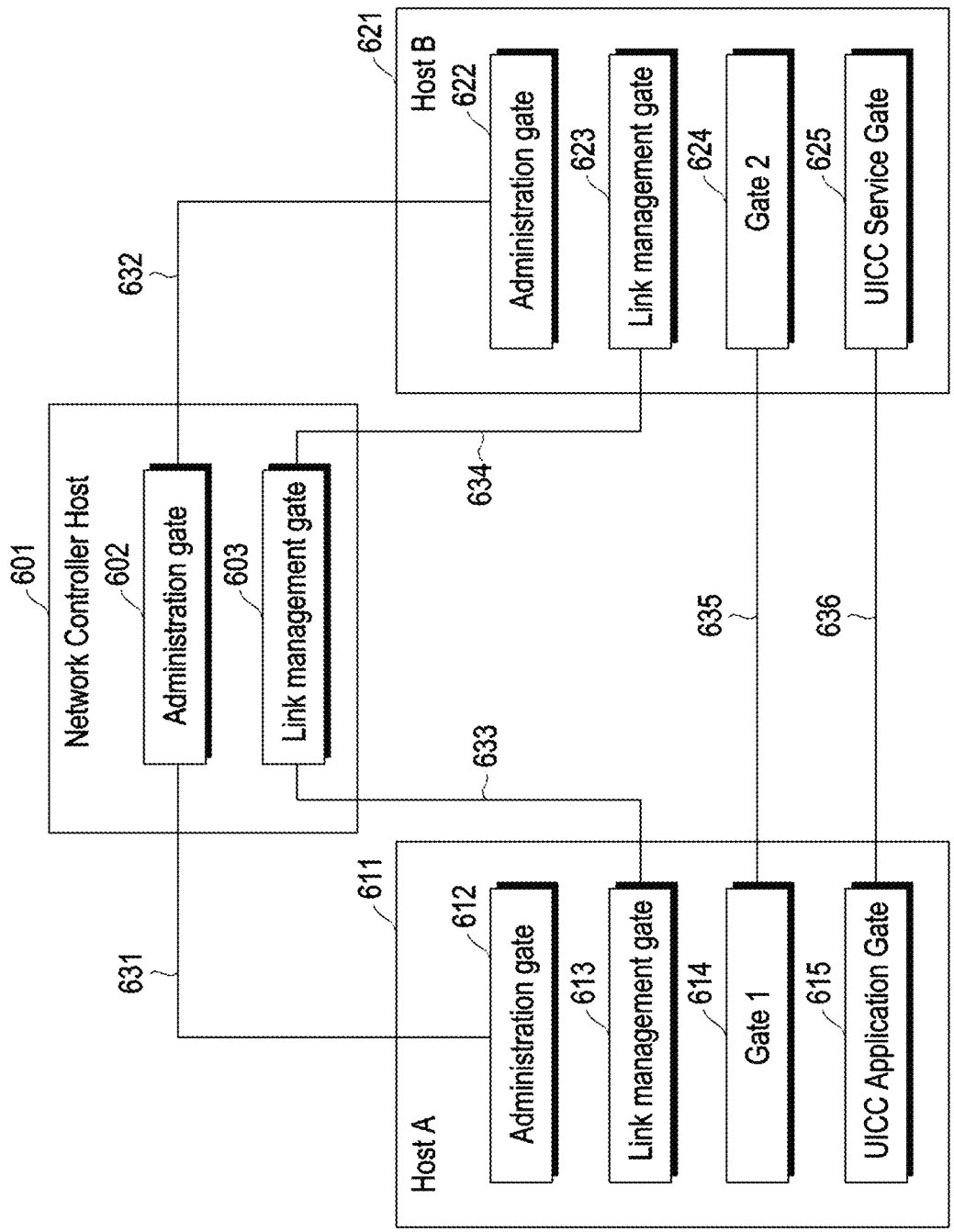
FIG. 6 is a diagram illustrating an embodiment in which hosts in an iSSP generate a pipe through a gate according to various embodiment of the disclosure.

FIG. 6 is a diagram illustrating an embodiment in which hosts in an iSSP generate a pipe through a gate according to various embodiment of the disclosure.

A network controller host 601 of the iSSP may include an administration gate 602. The administration gate 602 may form pipes with administration gates 612 and 622 in a host A 611 and a host B 621 which are different hosts, respectively (631 and 632) to perform an administration function between the host A 611 and the host B 621.

A link management gate 603 of the network controller host 601 may form pipes with link management gates 613 and 623 in the host A 611 and the host B 621 which are the different hosts, respectively (633 and 634) to perform a function (link management) of managing a link connection between the host A 611 and the host B 621.

The host A 611 and the host B 621 may form pipes through gates which correspond to a specific service, and may perform a service by exchanging a command and a response or exchanging an event.

A gate 1 614 in the host A 611 and a gate 2 in the host B 621 which correspond to the same service may form a pipe 635 therebetween to perform the corresponding service.

If the host A 611 is a MODEM and the host B 621 is a telecom bundle, an APDU pipe 636 may be formed between a UICC application gate 615 in the host A 611 and a UICC service gate 625 in the host B 621 to perform an APDU communication and perform various services and functions performed in a UICC.

Figure 7A:
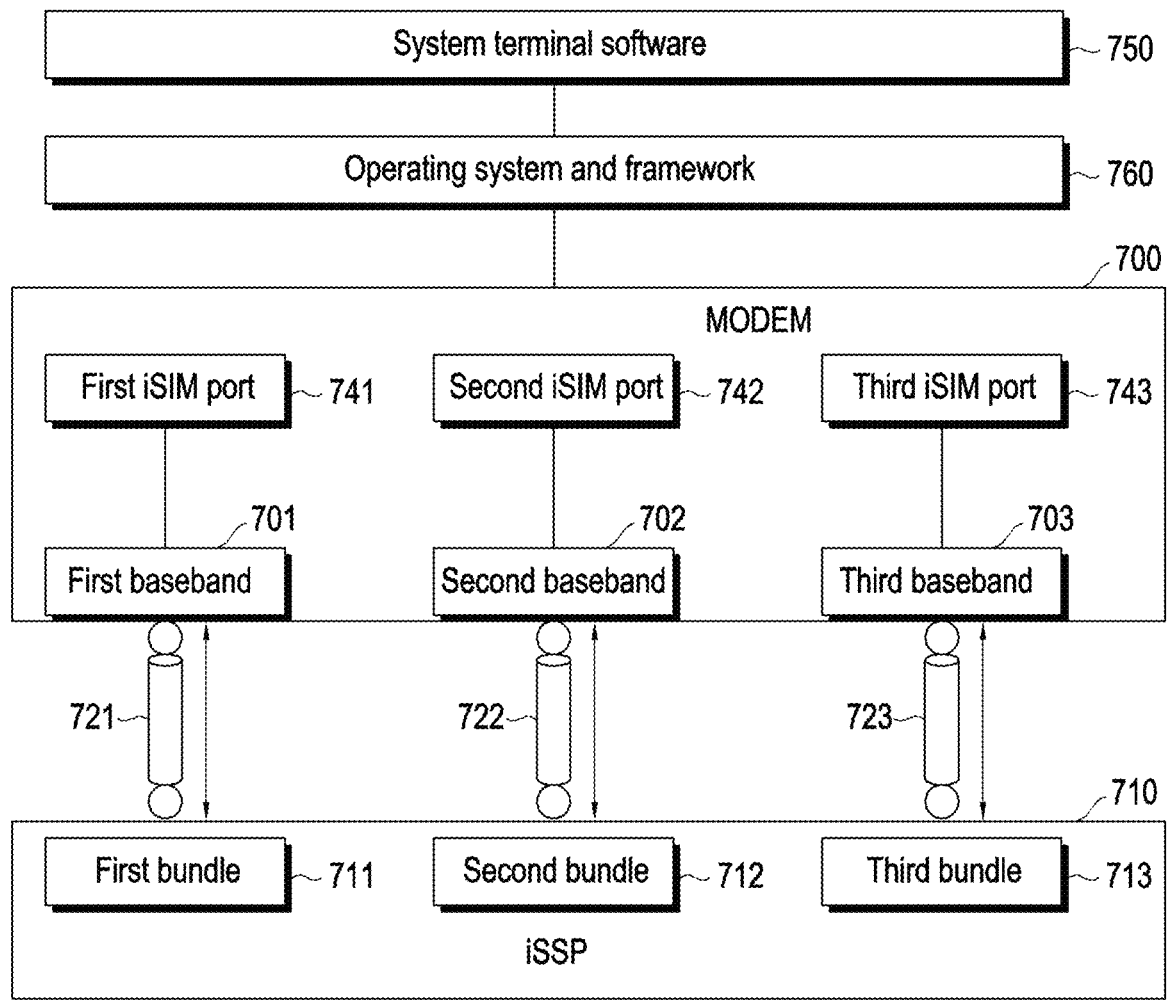
FIG. 7A is a diagram illustrating a multi-SIM MODEM in a terminal and a state in which a plurality of telecom bundles in an iSSP are connected to iSIM ports, respectively, according to various embodiments of the disclosure.

FIG. 7A is a diagram illustrating a multi-SIM MODEM in a terminal and a state in which a plurality of telecom bundles in an iSSP are connected to iSIM ports, respectively, according to various embodiments of the disclosure.

A multi-SIM MODEM 700 supports a plurality of logical basebands 701, 702, and 703. The multi-SIM MODEM 700 in FIG. 7A may be an example of a triple-SIM MODEM supporting three logical basebands and three iSIM ports.

The first logical baseband 701, the second logical baseband 702, and the third logical baseband 703 may support the same radio access capability or different radio access capabilities. For example, all of the three logical basebands 701, 702, and 703 may be logical basebands supporting a 5G network. In another example, two of the three logical basebands 701, 702, and 703 may support the 5G network, and the other one logical baseband may support a 4G network. In another example, the three logical basebands 701, 702, and 703 may support 4G, 5G, and 6G networks, respectively.

The multi-SIM MODEM 700 in FIG. 7A has the three iSIM ports. The three iSIM ports correspond to a first iSIM port 741, a second iSIM port 742, and a third iSIM port 743, respectively.

In FIG. 7A, the first iSIM port 741 is an iSIM port using the first baseband 701, the second iSIM port 742 is an iSIM port using the second baseband 702, and the third iSIM port 743 is an iSIM port using the third baseband 703.

FIG. 7A shows that a first bundle 711 accesses a network by using the first baseband 701, a second bundle 712 accesses a network by using the second baseband 702, and a third bundle 713 accesses a network by using the third baseband 703.

FIG. 7A shows a case that the first bundle 711 is connected to the first iSIM port 741, the second bundle 712 is connected to the second iSIM port 742, and the third bundle 713 is connected to the third iSIM port 743.

According to FIG. 7A, the first iSIM port 741 is connected to the first baseband 701, and the first bundle 711 is activated and forms a first pipe 721 with a gate connected to the first baseband 701 to be connected to the first iSIM port 741.

Similarly, according to FIG. 7A, the second iSIM port 742 is connected to the second baseband 702, and the second bundle 712 is activated and forms a second pipe 722 with a gate connected to the second baseband 702 to be connected to the second iSIM port 742.

Similarly, according to FIG. 7A, the third iSIM port 743 is connected to the third baseband 703, and the third bundle 713 is activated and forms a third pipe 723 with a gate connected to the third baseband 703 to be connected to the third iSIM port 743.

Although not shown in FIG. 7A, connection relationships 731, 732, and 733 between the iSIM ports 741, 742, and 743 and the logical basebands 701, 702, and 703 may change according to a MODEM setting. The MODEM setting may change by system terminal software 750. The system terminal software 750 may be system software which may manage the MODEM 700 by using an API provided through an operating system and framework 760 by the MODEM 700. For example, the system terminal software 750 may be terminal software having a system access right, such as a SIM card manager of an Android terminal. According to a user's selection, the system terminal software 750 may change the connection relationships 731, 732, and 733 between the iSIM ports 741, 742, and 743 and the basebands 701, 702, and 703. For example, according to a specific setting, the first iSIM port 741 may be connected to the second baseband 702, the second iSIM port 742 may be connected to the third baseband 703, and the third iSIM port 743 may be connected to the first baseband 701. In addition, the iSIM ports 741, 742, and 743 and the logical basebands 701, 702, and 703 may be connected to each other according to any combinations satisfying 1:1 correspondence (bijection) therebetween.

Figure 7B:
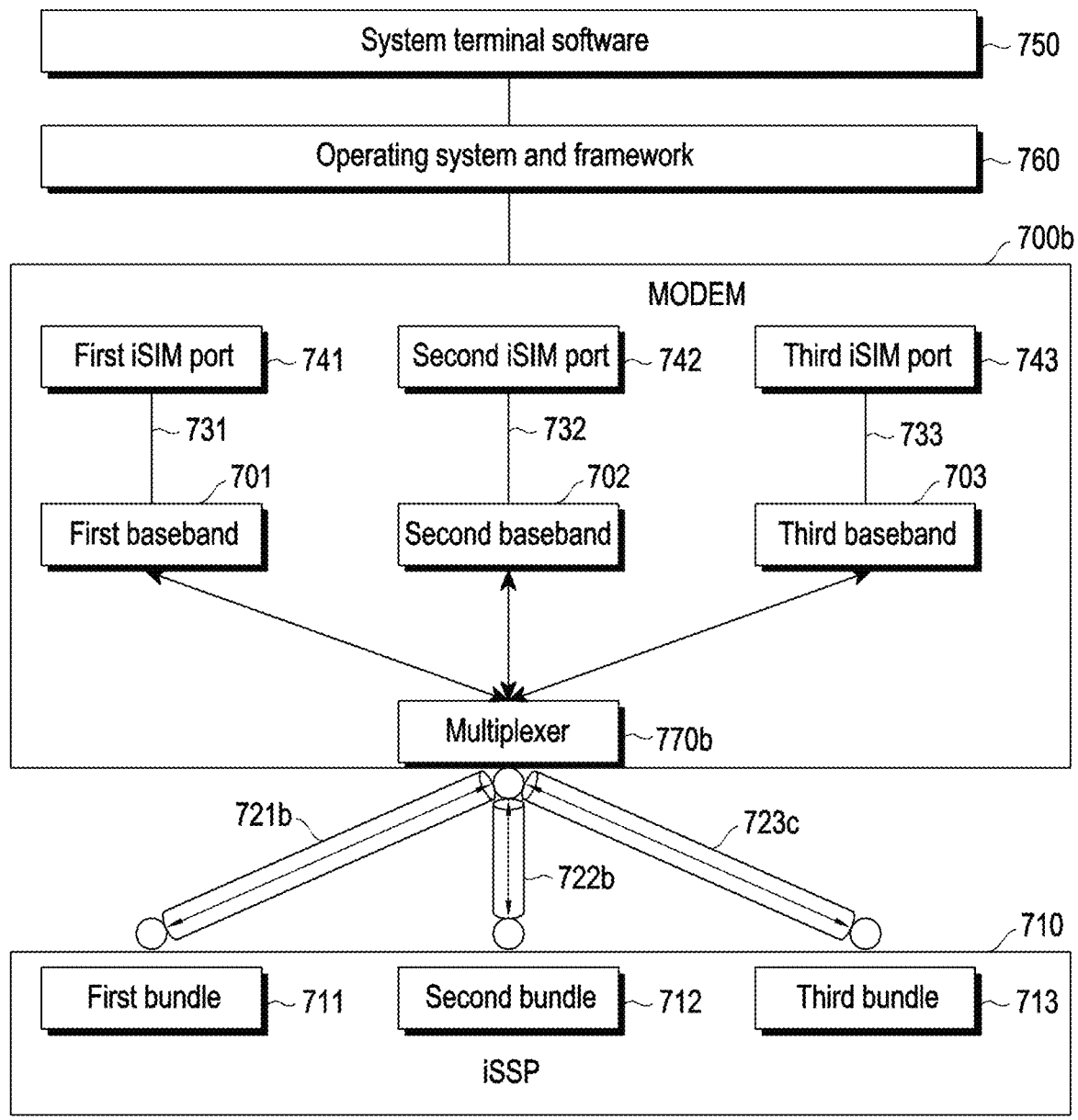
FIG. 7B is a diagram illustrating another embodiment of a multi-SIM MODEM of a terminal and a state in which a plurality of telecom bundles in an iSSP are connected to iSIM ports, respectively, according to various embodiments of the disclosure.

FIG. 7B is a diagram illustrating another embodiment of a multi-SIM MODEM of a terminal and a state in which a plurality of telecom bundles in an iSSP are connected to iSIM ports, respectively, according to various embodiments of the disclosure.

Compared to an embodiment in FIG. 7A, an embodiment in FIG. 7B is different from the embodiment of FIG. 7A in that a MODEM 700*b* includes a multiplexer 770*b* and has one UICC application gate. In this case, gates (UICC service gates) of a plurality of bundles 711, 712, and 713 may be connected (mapped) to one gate (a UICC application gate) of the MODEM 700*b*.

As shown in FIG. 7B, in the MODEM 700*b*, the first bundle 711, the second bundle 712, and the third bundle 713 may be activated and form a first UICC pipe 721*b*, a second UICC pipe 722*b*, and a third UICC pipe 723*c*, respectively. Specifically, the first bundle 711, the second bundle 712, and the third bundle 713 may be activated, and the first UICC pipe 721*b*, the second UICC pipe 722*b*, and the third UICC pipe 723*c* may be formed between a gate (one UICC application gate) of the MODEM 700*b* and a gate of the first bundle 711, a gate of the second bundle 712, and a gate of the third bundle 713 (three UICC service gates), respectively. In this case, the multiplexer 770*b* may multiplex a communication with the first bundle 711, the second bundle 712, and the third bundle 713 through a pipe ID of three UICC pipes 721*b*, 722*b*, and 723*b* generated by one UICC application gate.

According to an embodiment, operations described in the embodiment in FIG. 7B may be applied to not only a case in which a MODEM includes one UICC application gate as shown in FIG. 7B, but also a case in which UICC service gates of a plurality of bundles are connected (mapped) to one UICC application gate. For example, the description in the embodiment in FIG. 7B may be also applied to a case in which a MODEM includes two UICC application gates, and one of the two UICC application gates is connected (mapped) to UICC service gates of a plurality of bundles.

Figure 8:
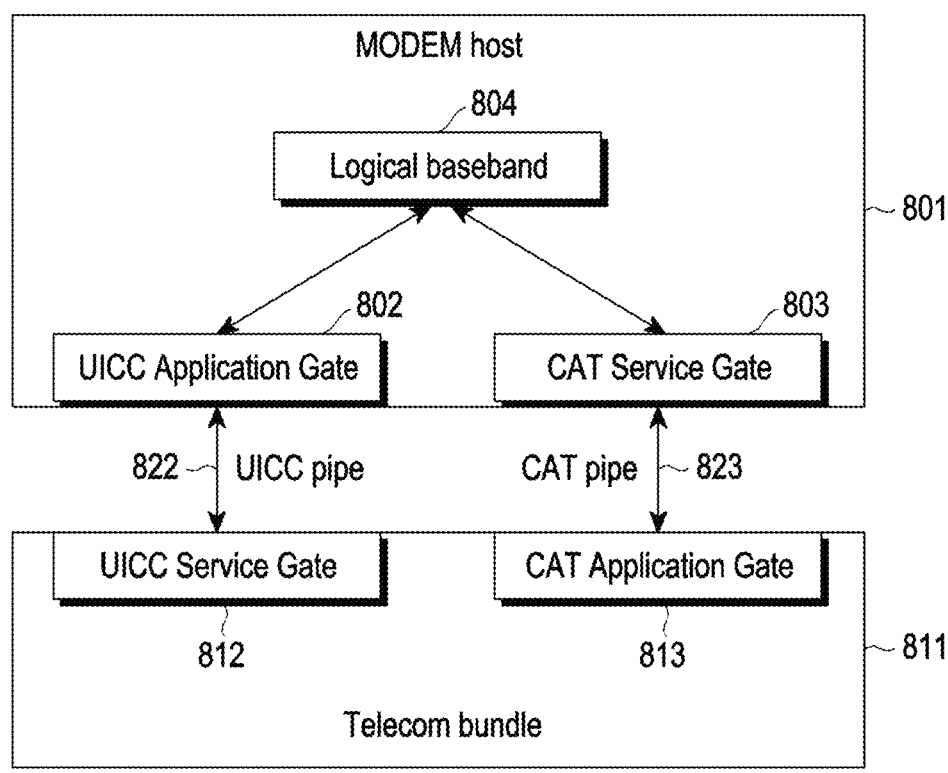
FIG. 8 is a diagram illustrating an example of forming a pipe for a communication between a MODEM host and a telecom bundle according to various embodiments of the disclosure.

FIG. 8 is a diagram illustrating an example of forming a pipe for a communication between a MODEM host and a telecom bundle according to various embodiments of the disclosure.

A MODEM host 801 may include one logical baseband 804. The logical baseband 804 may mean, for example, a protocol stack for a network access using authentication information of a SIM.

The MODEM host 801 may include a UICC application gate 822. The UICC application gate 822 may form a UICC pipe 822 with a UICC service gate 812 of a telecom bundle 811 to perform a UICC function.

The MODEM host 801 may include a card application toolkit (CAT) service gate 803. The CAT service gate 803 may form a CAT pipe 823 with a CAT application gate 813 of the telecom bundle 811 to perform a CAT service. A CAT may refer to the standard of ETSI TS 102 223 smart cards; card application toolkit (CAT). For example, the CAT application gate 813 of telecom bundle 811 may transmit a proactive UICC command to a MODEM by transferring a protective UICC command to the CAT service gate 803 through the CAT pipe 823.

Figure 9A:
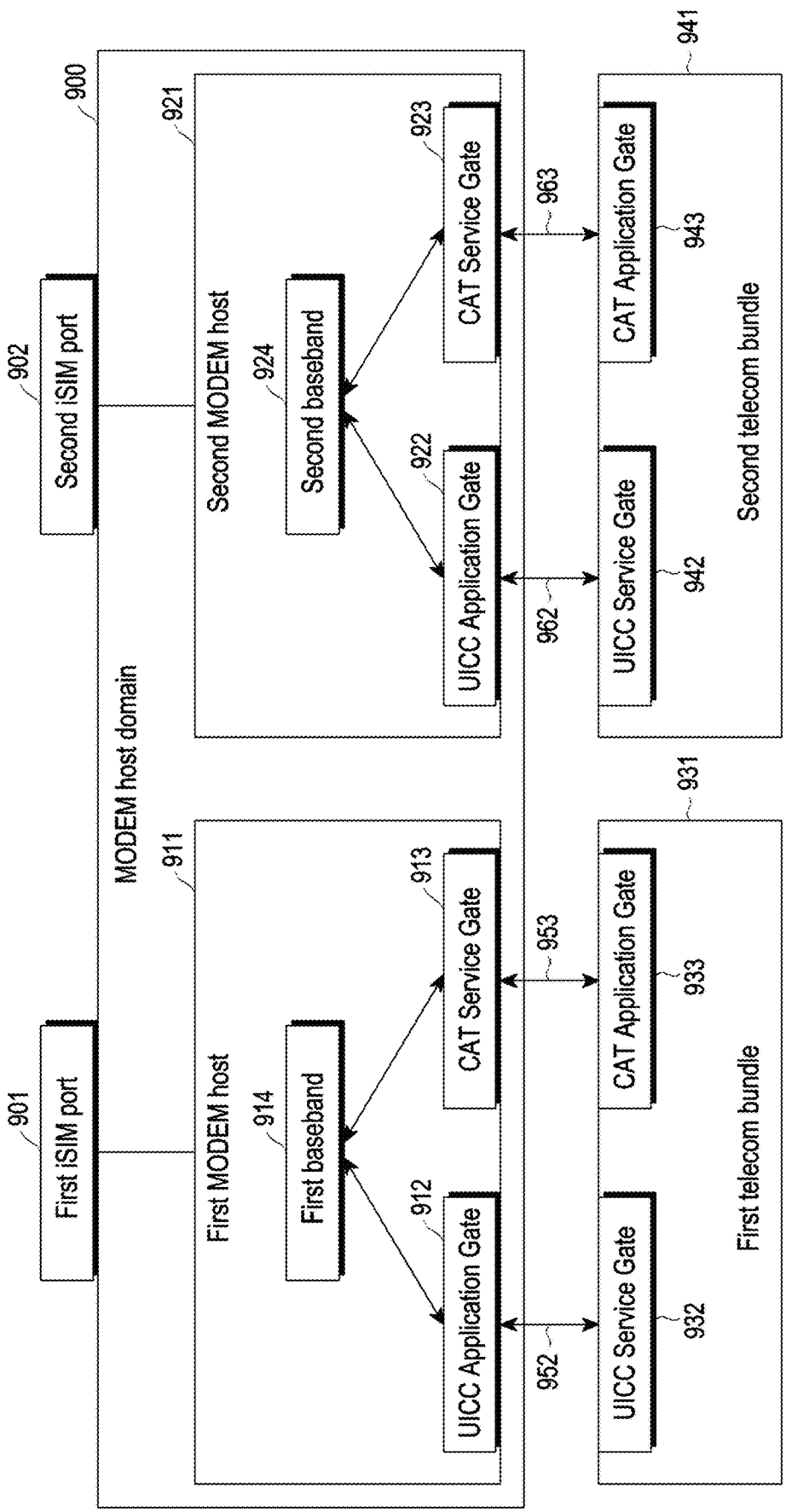
FIG. 9A is a diagram illustrating an embodiment in which a plurality of telecom bundles are activated in a multi-SIM MODEM and connected to iSIM ports according to various embodiments of the disclosure.

FIG. 9A is a diagram illustrating an embodiment in which a plurality of telecom bundles are activated in a multi-SIM MODEM and connected to iSIM ports according to various embodiments of the disclosure.

A multi-SIM MODEM may be called a MODEM host domain 900. The MODEM host domain 900 may have a plurality of MODEM hosts. FIG. 9A illustrates an example of a dual-SIM MODEM, and the MODEM host domain 900 of the dual-SIM MODEM includes two MODEM hosts (for example, a first MODEM host 911 and a second MODEM host 912).

In the embodiment, the first MODEM host 911 and the second MODEM host 921 may correspond to a MODEM host 801 in FIG. 8.

FIG. 9A shows an example in which the first MODEM host 911 is connected to a first iSIM port 901 and the second MODEM host 921 is connected to a second iSIM port 902.

According to FIG. 9A, a first telecom bundle 931 is activated and forms a UICC pipe 952 and a CAT pipe 953 with the first MODEM host 911, and may perform a network access through a first baseband 914.

According to FIG. 9A, the first MODEM host 911 is connected to the first iSIM port 901, and thus it may be understood that the first telecom bundle 931 is connected to the first iSIM port 901.

In addition, according to FIG. 9A, the second telecom bundle 941 is activated and forms a UICC pipe 962 and a CAT pipe 963 with the second MODEM host 921, and may perform a network access through a second baseband 954.

According to FIG. 9A, the second MODEM host 921 is connected to the second iSIM port 902, and thus it may be understood that the second telecom bundle 941 is connected to the second iSIM port 902.

Figure 9B:
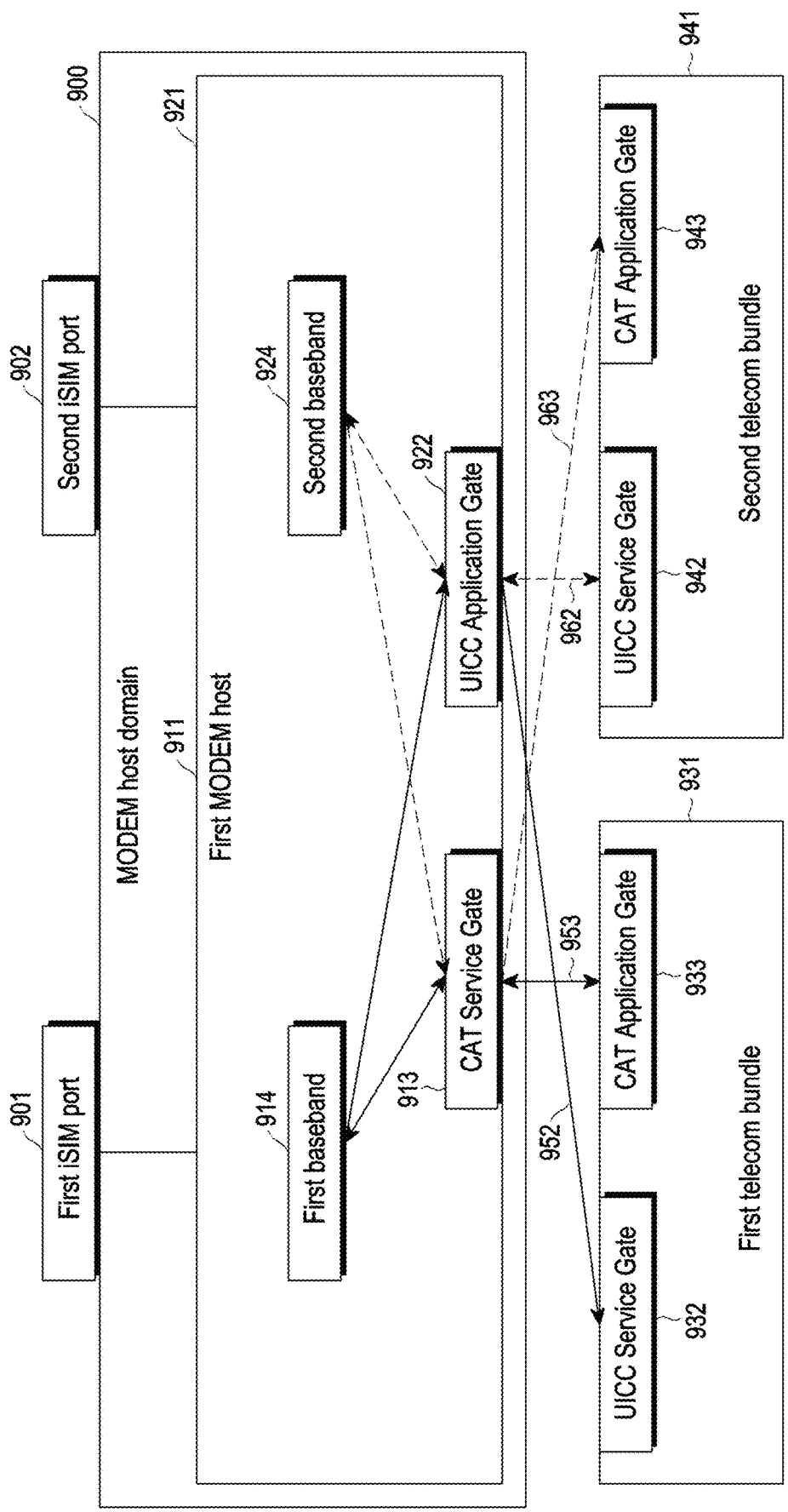
FIG. 9B is a diagram illustrating another embodiment in which a plurality of telecom bundles are activated in a multi-SIM MODEM and connected to iSIM ports according to various embodiments of the disclosure.

FIG. 9B is a diagram illustrating another embodiment in which a plurality of telecom bundles are activated in a multi-SIM MODEM and connected to iSIM ports according to various embodiments of the disclosure.

There is a different between FIG. 9A and FIG. 9B in that a MODEM host domain 900 in FIG. 9B has a single MODEM host (for example, a first MODEM host 911). The first MODEM host 911 has a plurality of basebands 914 and 924 and may have one UICC application gate 922 and one CAT service gate 913 used for a communication with telecom bundles.

According to FIG. 9B, when a first telecom bundle 931 and a second telecom bundle 941 are activated and form pipes with the first MODEM host 911, both a UICC service gate 932 of the first telecom bundle 931 and a UICC service gate 942 of the second telecom bundle 941 may form pipes 952 and 962 with a UICC application gate 922 of the first MODEM host 911. In this case, the first MODEM host 911 may identify a bundle to be used for a communication based on an identifier of a pipe.

Although not shown in FIG. 9B, a multiplexer of the first MODEM host 911 may identify a bundle for which the UICC application gate 922 forms a pipe (for example, either 952 or 962) based on an identifier of the pipe.

In addition, when the first telecom bundle 931 and the second telecom bundle 941 are activated and form pipes with the first MODEM host 911, both a CAT application gate 933 of the first telecom bundle 931 and a CAT application service gate 943 of the second telecom bundle 941 may form pipes with the CAT service gate 913 of the first MODEM host 911. In this case, the CAT service gate 913 may perform a process by identifying a bundle used for a communication according to whether a pipe identifier of a transferred packet is an identifier of the CAT pipe 953 or an identifier of the CAT pipe 963.

If it is assumed that the first telecom bundle 931 is connected to the first iSIM port 901 and uses the first baseband 914, a multiplexer of the first MODEM host 911 may forward a packet received through the pipe 953 from the CAT service gate 913, to the first baseband 914. Similarly, the UICC application gate 922 may transfer, to the pipe 952, a packet which a terminal transfers through the first iSIM port 901 to transmit the packet to the first telecom 931, thereby transferring the packet to the UICC service gate 932 of the first telecom bundle 931.

Figure 10:
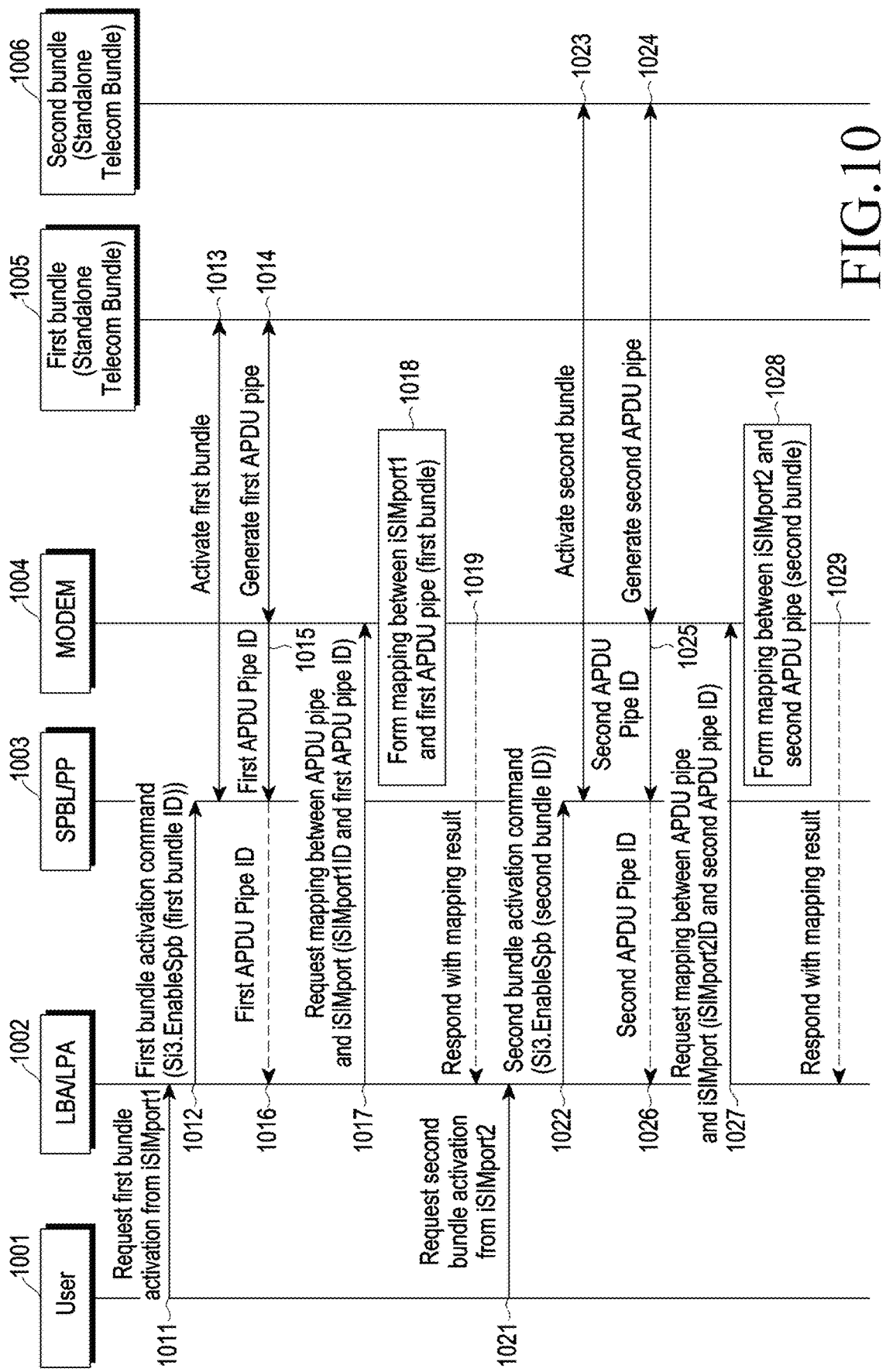
FIG. 10 is a diagram illustrating an embodiment of a process of activating two telecom bundles upon a user's request and allocating the two telecom bundles to two SIM ports of a MODEM, respectively, according to various embodiments of the disclosure.

FIG. 10 is a diagram illustrating an embodiment of a process of activating two telecom bundles upon a user's request and allocating the two telecom bundles to two SIM ports of a MODEM, respectively, according to various embodiments of the disclosure.

Operations 1011 to 1019 show a series of embodiments of activating a first bundle 1005 upon a user's request and connecting the first bundle 1005 to an iSIM port 1 of a MODEM.

Operations 1021 to 1029 show a series of embodiments of activating a second bundle 1006 upon a user's request and connecting the second bundle 1006 to an iSIM port 2 of the MODEM.

In operation 1011, a user 1001 requests first bundle activation from an LBA 1002 (or an LPA). In operation 1011, through a SIM card setting UI of a terminal, the user 1001 activates a telecom company of the first bundle 1005 in a specific SIM slot. For example, the user may intend to activate the first bundle 1005 in the iSIMport1.

In operation 1012, the LBA 1002 transfers a first bundle activation command to an SPBL 1003. In operation 1012, for example, the first bundle activation command may be an Si3.EnableSpb command including an identifier of the first bundle identifier 1005.

In operation 1013, the SPBL 1003 activates the first bundle 1005 through a primary platform (PP) of an iSSP. An operation of activating the first bundle 1005 may be, for example, an operation of decrypting and activating an encrypted first bundle 1005 and moving up the same to a RAM. After the first bundle 1005 is activated, the first bundle 1005 may broadcast to other entities in the iSSP that the first bundle 1005 is activated. For example, the corresponding broadcasting may be performed through an entity called a network controller host in the iSSP.

As the first bundle 1005 is activated, a MODEM 1004 and the first bundle 1005 form a first APDU pipe in operation 1014.

In operation 1015, the MODEM 1004 transfers an identifier of the first APDU pipe to the SPBL 1003. Operation 1015 may be performed in connection with a network controller host (NCH) and a router which are entities in the iSSP.

In operation 1016, the SPBL 1003 may transfer a response to the first bundle activation command in operation 1012 to the LBA 1002. if the first bundle 1005 is successfully activated and forms the first APDU pipe with the MODEM 1004, the response in operation 1016 may include a first APDU pipe identifier. The LBA 1002 may identify the identifier of the first APDU pipe formed for the first bundle 1005 activated in operation 1012 to communicate with the MODEM 1004 based on the first APDU pipe identifier received from the SPBL 1003.

In operation 1017, the LBA 1002 transmits an APDU pipe-to-iSIM port mapping request to the MODEM 1004 to map the first bundle 1005 to the iSIM port 1 in the MODEM 1004. The corresponding APDU pipe-to-iSIM port mapping request may include an identifier of an APDU pipe and an identifier of an iSIM port to be mapped. If there is no direct data transfer route between the LBA 1002 and the MODEM 1004, operation 1017 may be performed via the SPBL 1003. In this case, the LBA 1002 may transfer the APDU pipe-to-iSIM port mapping request to the SPBL 1003, the SPBL 1003 transfers the same to the MODEM 1004, and thus the identifier of the APDU pipe and the identifier of the iSIM port to be mapped may be transferred to the MODEM 1004.

In operation 1018, the MODEM 1004 maps the iSIMport identifier and the APDU pipe identifier transferred in operation 1017. Operation 1018 may be an operation of connecting a bundle (the first bundle 1005) connected via an APDU pipe (the first APDU pipe) having the transferred APDU pipe identifier, among APDU pipes formed by the MODEM 1004 with a logical baseband associated with the transferred iSIMport identifier. For example, operation 1018 may be an internal operation of the MODEM 1004, which allows a network access through a logical baseband associated with the iSIMport identifier by utilizing a K value and an IMSI of the first bundle 1005. Through operation 1018, activated telecom bundles may be connected to a specific logical baseband in the MODEM 1004 to perform a network access.

In operation 1019, the MODEM 1004 may respond with a result of the execution of operation 1018. Through operation 1019, the LBA 1002 may recognize that the first bundle 1005 is successfully mapped to the iSIMport which corresponds to the iSIMport1ID.

Operations 1021 to 1029 show a procedure of activating the second bundle 1006 and mapping the same to an iSIMport2. Operations 1021, 1022, 1023, 1024, 1025, 1026, 1027, 1028, and 1029 may be performed with reference to operations 1011, 1012, 1013, 1014, 1015, 1016, 1017, 1018, and 1019, respectively.

Figure 11:
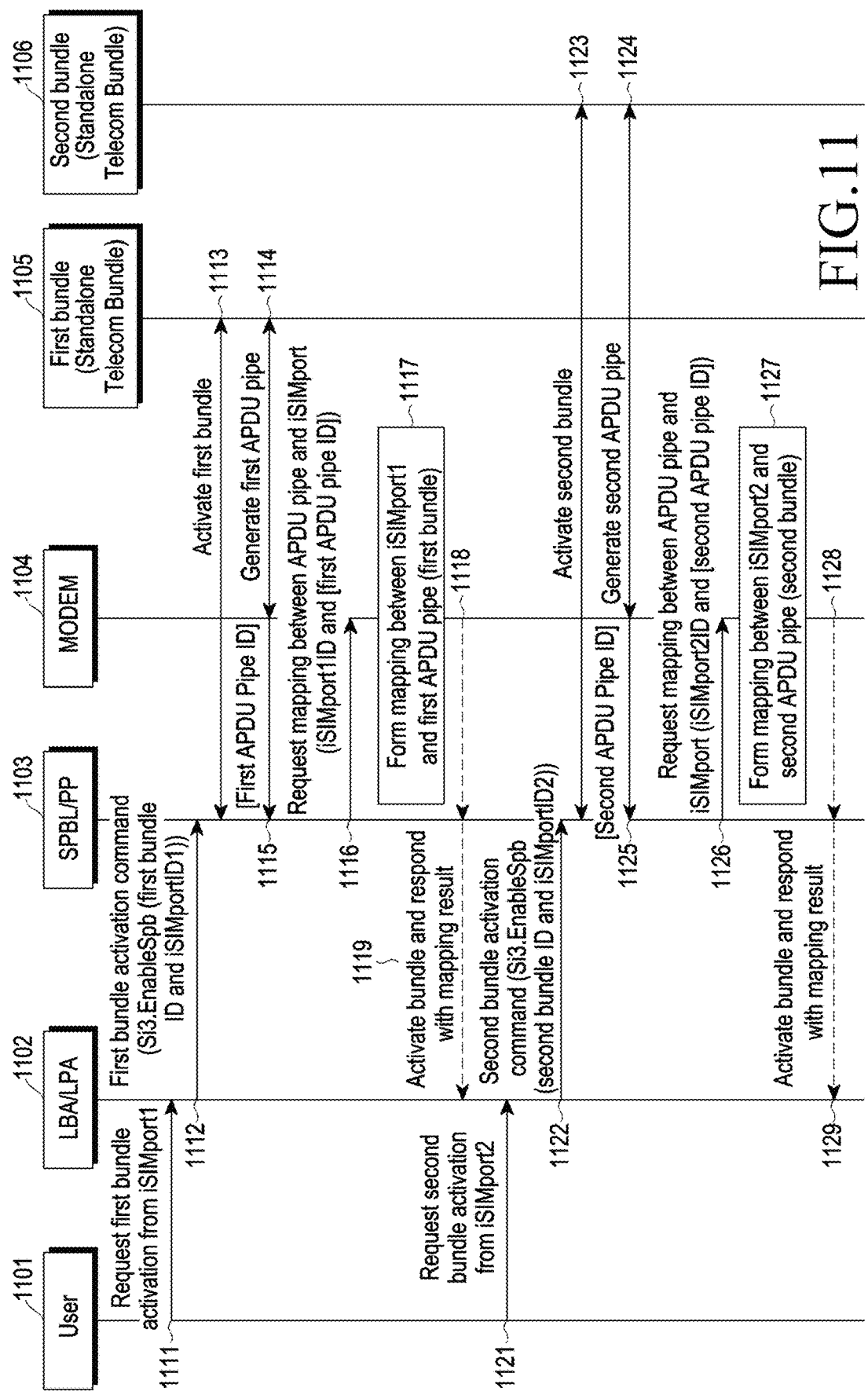
FIG. 11 is a diagram illustrating another embodiment of a process of activating two telecom bundles upon a user's request and allocating the two telecom bundles to two SIM ports of a MODEM, respectively, according to various embodiments of the disclosure.

FIG. 11 is a diagram illustrating another embodiment of a process of activating two telecom bundles upon a user's request and allocating the two telecom bundles to two SIM ports of a MODEM, respectively, according to various embodiments of the disclosure.

Unlike FIG. 10, FIG. 11 illustrates some embodiments in which a bundle activation command transmitted to an SPBL 1103 by an LBA 1102 includes an identifier of an iSIM port.

Operations 1111 to 1119 show a series of embodiments of activating a first bundle 1105 upon a user's request and connecting the first bundle 1105 to an iSIM port 1 of a MODEM.

Operations 1121 to 1129 show a series of embodiments of activating a second bundle 1106 upon a user's request and connecting the second bundle 1106 to an iSIM port 2 of the MODEM.

In operation 1111, a user 1101 requests activation of the first bundle 1105 from an LBA 1102. In operation 1111, through a SIM card setting UI of a terminal, the user 1101 may activate a telecom company of the first bundle 1105 in a specific SIM slot. For example, the user 1001 may intend to activate the first bundle 1105 in an iSIMport 1.

In operation 1112, the LBA 1102 transfers a first bundle activation command to the SPBL 1103. In operation 1112, for example, the first bundle activation command may be an Si3.EnableSpb command including an identifier of the first bundle 1105 and an identifier of the iSIMport1.

In operation 1113, the first bundle 1105 is activated through the SPBL 1103. Operation 1113 in FIG. 11 may correspond to operation 1013 in FIG. 10.

In operation 1114, a MODEM 1104 and the first bundle 1105 forms an APDU pipe. The formed APDU pipe may be called a first APDU pipe. Operation 1114 in FIG. 11 may correspond to operation 1014 in FIG. 10.

In operation 1115, the MODEM 1104 may transfer an identifier of the first APDU pipe to the SPBL 1103. Operation 1115 may be omitted according to some embodiments.

In operation 1116, the SPBL 1103 may request APDU pipe-to-iSIMport mapping from the MODEM 1104. The mapping request may include an identifier of an iSIMport. The mapping request may further include an APDU pipe identifier. The APDU pipe identifier included in the mapping request may be the APDU pipe identifier transferred in operation 1115.

In operation 1117, the MODEM 1104 may perform the iSIM port-to-APDU pipe mapping. According to an example in FIG. 11, operation 1117 may be a process of mapping the first APDU pipe formed between the MODEM 1104 and the activated first bundle 1105 in operation 1113 to the iSIM port which corresponds to the iSIMport identifier transferred in operation 1116. Through operation 1117, the first bundle 1105 may access a network by using a logical baseband which corresponds to the iSIMport1 of the MODEM 1104 based on the user's request in operation 1111.

In operation 1118, the MODEM 1104 may inform the SPBL 1103 of a result showing that operation 1117 is successfully performed.

In operation 1119, the SPBL 1103 may transfer, to the LBA 1102, whether the first bundle 1105 is activated (whether operation 1113 is successfully performed) and whether mapping to the iSIM port in the MODEM 1104 of the activated bundle 1105 is performed (whether operation 1117 is successfully performed).

In operation 1119, the LBA 1102 responded with successfully bundle activation and successful mapping to the iSIM port may show the user 1101 that the first bundle 1105 is activated in the iSIMport1 and is being used, on a screen through a UI.

Operations 1121 to 1129 show a procedure of activating the second bundle 1106 and mapping the same to an iSIMport2. Operations 1121, 1122, 1123, 1124, 1125, 1126, 1127, 1128, and 1129 may be performed with reference to operations 1111, 1112, 1113, 1114, 1115, 1116, 1117, 1118, and 1119, respectively.

Figure 12:
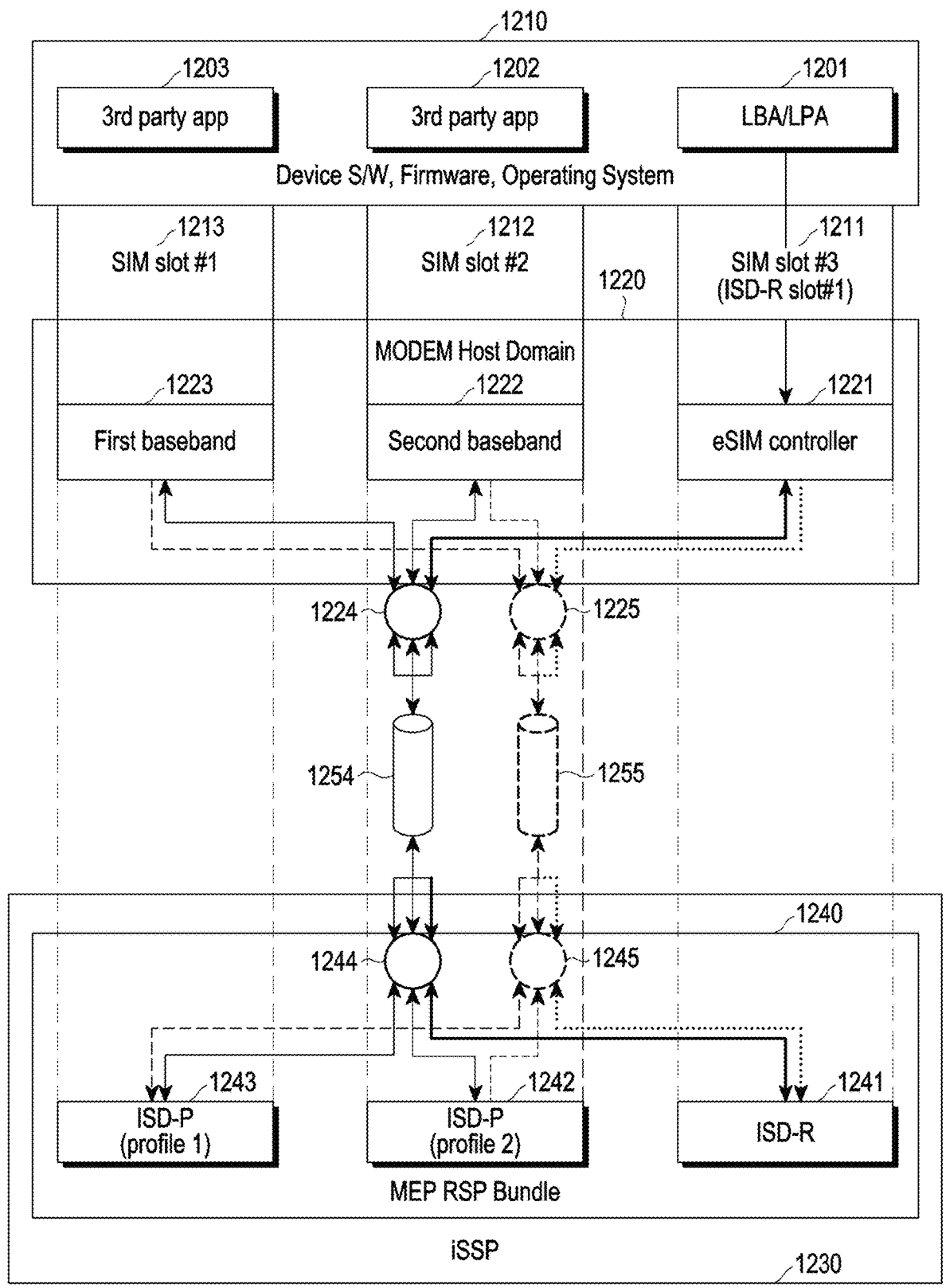
FIG. 12 is a diagram schematically illustrating an example in which an eSIM bundle capable of simultaneously activating a plurality of profiles is connected to a multi-SIM MODEM in a terminal in a wireless communication system according to various embodiments of the disclosure.

FIG. 12 is a diagram schematically illustrating an example in which an eSIM bundle capable of simultaneously activating a plurality of profiles is connected to a multi-SIM MODEM in a terminal in a wireless communication system according to various embodiments of the disclosure.

Referring to FIG. 12, a multi-SIM MODEM 1220 has two logical basebands, and thus may support two communication lines at the same time.

The multi-SIM MODEM 1220 may also be referred to as a MODEM host domain 1220. The MODEM host domain 1220 may include a plurality of MODEM hosts.

The multi-SIM MODEM 1220 may be, for example, a dual SIM MODEM, and includes two basebands, for example, a first baseband 1223 and a second baseband 1222. Here, a baseband may be a logical baseband.

The multi-SIM MODEM 1220 may include an eSIM controller 1221. If a command is inputted from an LBA which is iSSP control software of a terminal and an LPA which is eSIM bundle control software, the eSIM controller 1221 may transfer the command to control an MEP RSP bundle 1240 of an iSSP.

Bundle and iSSP management software such as a third-party app such as a communication provider app within the terminal or a SIM card manager which is device software of managing communication profile setting, or an LBA/LPA may try to access an iSSP through an interface provided by the multi-SIM MODEM 1220 or to access and control a telecom bundle and an eSIM bundle within the iSSP.

The interface provided by the multi-SIM MODEM 1220 may be referred to as a SIM slot, and in a case shown in FIG. 12, a device software or OS 1210 may access the multi-SIM MODEM 1220, or an iSSP 1230 or an MEP RSP bundle 1240 within the iSSP 1230 through a SIM slot #1 1213, a SIM slot #2 1212, and a SIM slot #3 1211. The MEP RSP bundle 1240 is a telecom bundle including an eUICC function defined in an eSIM standard of GSM Association (GSMA), may include a plurality of communication profiles, e.g., a profile 1 1242 and a profile 2 1243, and may include an issuer security domain root (ISD-R) 1241 which processes a command for controlling an eUICC from the LPA 1201. The MEP RSP bundle 1240 may simultaneously activate communication profiles which correspond to the number of communication profiles which the multi-SIM MODEM 1220 may support simultaneously among the plurality of communication profiles 1242 and 1243.

According to FIG. 12, the multi-SIM MODEM 1220 may generate a UICC APDU pipe 1254 and a CAT APDU pipe 1255 between the multi-SIM MODEM 1220 and the MEP RSP bundle 1240. The UICC APDU pipe 1254 may be formed between a UICC APDU application gate 1224 of the MODEM host domain of the multi-SIM MODEM 1220 and a UICC APDU service gate 1244 of the MEP RSP bundle 1240. The CAT APDU pipe 1255 may be formed between a CAT service gate 1225 of the MODEM host domain of the multi-SIM MODEM 1220 and a CAT application gate 1245.

According to an embodiment as shown in FIG. 12, there is the one UICC APDU pipe 1254 between the multi-SIM MODEM 1220 and the MEP RSP bundle 1240, so a multiplexing function is required between the multi-SIM MODEM 1220 and the MEP RSP bundle 1240. For example, if the profile 1 1243 is connected to the first baseband 1223 and then activated, it may be assumed that the profile 1 1243 is accessible through the SIM slot #1 1213. It may be assumed that the profile 2 1242 is connected to the second baseband 1222 and then activated, and the profile 2 1242 is accessible through the SIM slot #2 1212. It may be assumed that the LBA/LPA 1201 transfers, to the ISD-R 1241, a state change command of a profile within the MEP RSP bundle 1240. Depending on which SIM slot a command is transferred through among the SIM slot #1 1213, the SIM slot #2 1212, and the SIM slot #3 1211, the UICC APDU service gate 1244 may transfer the command to one of the profile 1 1243, the profile 2 1242, or the ISD-R 1241. The multiplexing function may be used by borrowing a multiplexing function between an eUICC and a MODEM which supports a plurality of communication profiles in a single ISO 7816-3 interface.

For example, it may be assumed that a connection between the first baseband 1223 and the profile 1 1243 is an eSIM port #1, a connection between the second baseband 1222 and the profile 2 1242 is an eSIM port #2, and a connection between the eSIM controller 1221 and the ISD-R 1241 is an eSIM port #3. In addition, it may be assumed that the SIM slot #1 1213 is an interface which transfers a command to the eSIM port #1, the SIM slot #2 1212 is an interface which transfers a command to the eSIM port #2, and the SIM slot #3 1211 is an interface which transfers a command to the eSIM port #3. If there is a command transferred through the SIM slot #1 1213, the multi-SIM MODEM 1220 may first transfer, to the UICC APDU pipe 1254, an APDU having the meaning of transferring a command to the eSIM port #1 to inform that a command to be transferred later may be transferred to the profile 1 1243 related to the eSIM port #1, and then transfer the command transferred through the SIM slot #1 1213 to the UICC APDU pipe 1254.

Alternatively, by transferring the command by attaching a header to the command and including data which may cause to recognize which eSIM port the command is related to in the header, the MEP RSP bundle 1240 may determine to transfer the command to which of the profile 1 1243, the profile 2 1242, and the ISD-R 1241 based on the header.

Figure 13:
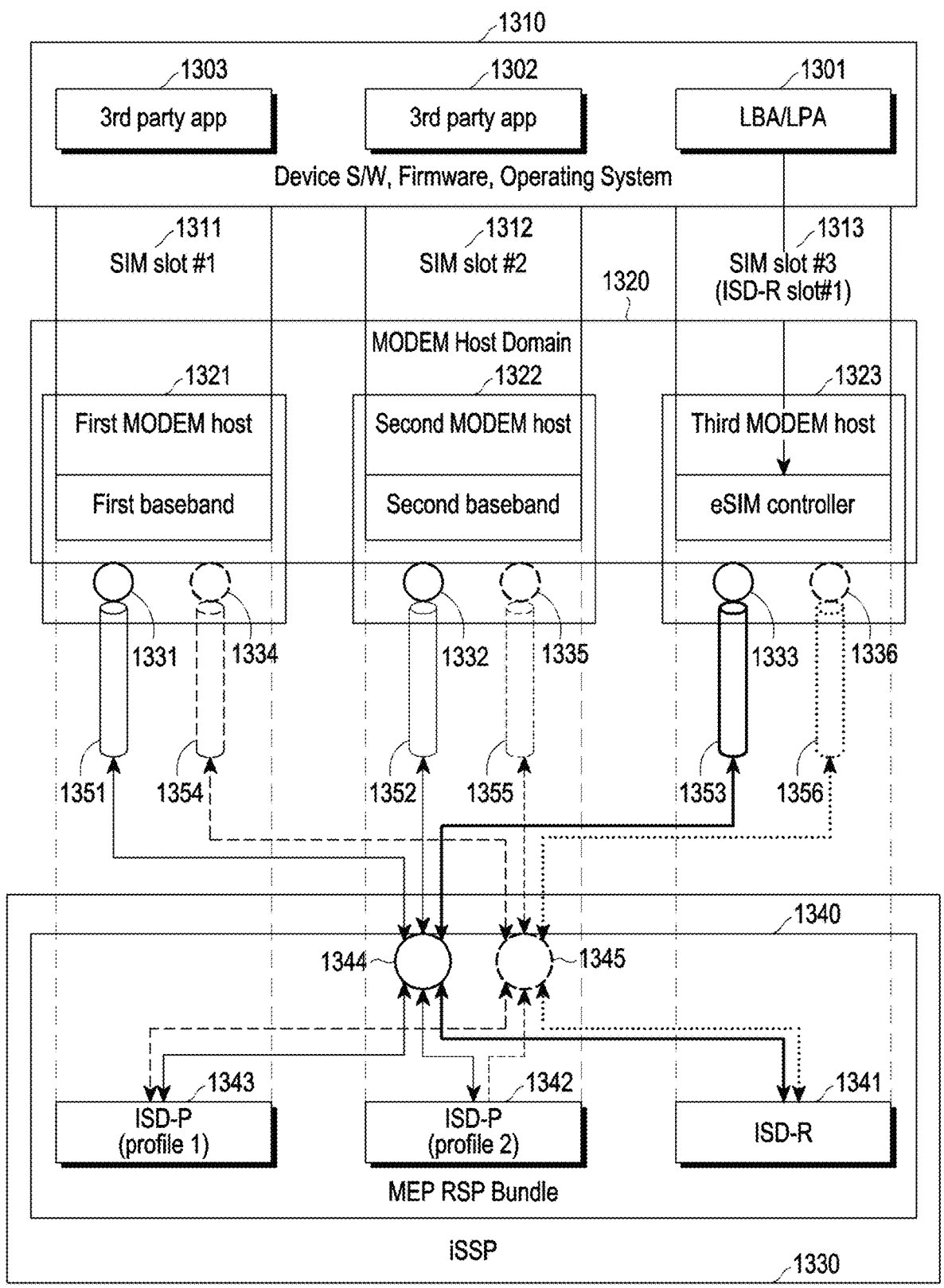
FIG. 13 is a diagram schematically illustrating another example in which an eSIM bundle capable of simultaneously activating a plurality of profiles is connected to a multi-SIM MODEM in a terminal in a wireless communication system according to various embodiments of the disclosure.

FIG. 13 is a diagram schematically illustrating another example in which an eSIM bundle capable of simultaneously activating a plurality of profiles is connected to a multi-SIM MODEM in a terminal in a wireless communication system according to various embodiments of the disclosure.

Referring to FIG. 13, a multi-SIM MODEM 1320 includes two logical basebands, so the multi-SIM MODEM 1320 may support two communication lines at the same time.

In embodiments of the disclosure, the multi-SIM MODEM 1320 may support one more SIM slots than the number of logical basebands supported by the multi-SIM MODEM 1320. This additional one SIM slot may be used for managing an MEP RSP bundle 1340 by transferring a command to the MEP RSP bundle 1340, and may be a SIM slot which an LBA/LPA 1301 which has access authority for an iSSP 1330 or the MEP RSP bundle 1340 may use.

In embodiments of the disclosure, the multi-SIM MODEM 1320 may form the same number of UICC APDU pipes as the number of SIM slots supported by the multi-SIM MODEM 1320 between the multi-SIM MODEM 1320 and the MEP RSP bundle 1340. FIG. 13 shows a case that three UICC APDU pipes 1351, 1352, and 1353 are formed between the multi-SIM MODEM 1320 and the MEP RSP bundle 1340. Further, FIG. 13 shows a case that three CAT APDU pipes 1354, 1355, and 1356 are formed between the multi-SIM MODEM 1320 and the MEP RSP bundle 1340.

Referring to FIG. 13, the multi-SIM MODEM 1320 may be referred to as a MODEM host domain. The MODEM host domain 1320 may include a plurality of MODEM hosts, e.g., a first MODEM host 1321, a second MODEM host 1322, and a third MODEM host 1323. As shown in FIG. 13, the first MODEM host 1321 may include a first baseband, and may include a UICC APDU application gate 1331 and a CAT APDU service gate 1334. As shown in FIG. 13, the second MODEM host 1322 may include a second baseband, and may include a UICC APDU application gate 1332 and a CAT APDU service gate 1335. As shown in FIG. 13, the third MODEM host 1323 may include an eSIM controller, and may include a UICC APDU application gate 1335 and a CAT APDU service gate 1336. The eSIM controller may receive a command from an LBA which is iSSP control software of a terminal and an LPA which is eSIM bundle control software to transfer the command to control the MEP RSP bundle 1340 of the iSSP 1330.

Bundle and iSSP management software such as a third-party app such as a communication provider app within the terminal or a SIM card manager which is device software of managing communication profile setting, or an LBA/LPA may try to access an iSSP through an interface provided by the multi-SIM MODEM 1320 or to access and control a telecom bundle and an eSIM bundle within the iSSP.

The interface provided by the multi-SIM MODEM 1320 may be referred to as a SIM slot, and in FIG. 13, a device software or OS 1310 may access the multi-SIM MODEM 1320, or an iSSP 1330 or an MEP RSP bundle 1340 within the iSSP 1330 through a SIM slot #1 1311, a SIM slot #2 1312, and a SIM slot #3 1313. The MEP RSP bundle 1340 is a telecom bundle including an eUICC function defined in an eSIM standard of GSMA, may include a plurality of communication profiles, e.g., a profile 1 1343 and a profile 2 1342, and may include an ISD-R 1341 which processes a command for controlling an eUICC from the LPA 1301. The MEP RSP bundle 1340 may simultaneously activate the same number of communication profiles as the number of communication profiles which the multi-SIM MODEM 1320 may support simultaneously among the plurality of communication profiles 1342 and 1343.

In FIG. 13, the multi-SIM MODEM 1320 may form a plurality of UICC APDU pipes 1351, 1352, and 1353 and a plurality of CAT APDU pipes 1354, 1355, and 1356 between the multi-SIM MODEM 1320 and the MEP RSP bundle 1340.

The first UICC APDU pipe 1351 may be formed between the first MODEM host 1321 of the multi-SIM MODEM 1320 and the MEP RSP bundle 1340. The first UICC APDU pipe 1351 may be formed between the UICC APDU application gate 1331 of the first MODEM host 1321 and the UICC APDU service gate 1344 of the MEP RSP bundle 1340.

The second UICC APDU pipe 1352 may be formed between the second MODEM host 1322 of the multi-SIM MODEM 1220 and the MEP RSP bundle 1340. The second UICC APDU pipe 1352 may be formed between the UICC APDU application gate 1332 of the second MODEM host 1322 and the UICC APDU service gate 1344 of the MEP RSP bundle 1340.

The third UICC APDU pipe 1353 may be formed between the third MODEM host 1323 of the multi-SIM MODEM 1320 and the MEP RSP bundle 1340. The third UICC APDU pipe 1353 may be formed between the UICC APDU application gate 1333 of the third MODEM host 1323 and the UICC APDU service gate 1344 of the MEP RSP bundle 1340.

In FIG. 13, it may be assumed that the profile 1 1343 is connected to a first baseband of the first MODEM host 1321 and then activated, and the profile 1 1341 is accessible through the SIM slot #1 1311. It may be assumed that the profile 2 1342 is connected to a second baseband of the second MODEM host 1322 and then activated, and the profile 2 1342 is accessible through the SIM slot #2 1312. Also, it may be assumed that the LBA/LPA 1301 transfers, to the ISD-R 1341, a state change command of a profile within the MEP RSP bundle 1340. Depending on which SIM slot a command is transferred from among the SIM slot #1 1311, the SIM slot #2 1312, and the SIM slot #3 1313, the command may be transferred to the MEP RSP bundle 1340 through the first UICC APDU pipe 1351, the second UICC APDU pipe 1352, or the third UICC APDU pipe 1353.

Unlike an embodiment shown in FIG. 12, an embodiment shown in FIG. 13 does not use one UICC APUD pipe, so a multiplexing function as described in FIG. 12 may not be required. Instead, the multi-SIM MODEM 1320 may perform a function in which a command transferred through the SIM slot #1 1311 is transferred to the first UICC APDU pipe 1351, a command transferred through the SIM slot #2 1312 is transferred to the second UICC APDU pipe 1352, and a command transferred through the SIM slot #3 1313 is transferred to the third UICC APDU pipe 1353.

In embodiments of the disclosure, the MEP RS bundle 1340 may transfer, to the profile 1 1343, a command transferred to the first UICC APDU pipe 1351, transfer, to the profile 2 1342, a command transferred to the second UICC APDU pipe 1352, and transfer, to the ISD-R 1341, a command transferred to the third UICC APDU pipe 1353.

Figure 14:
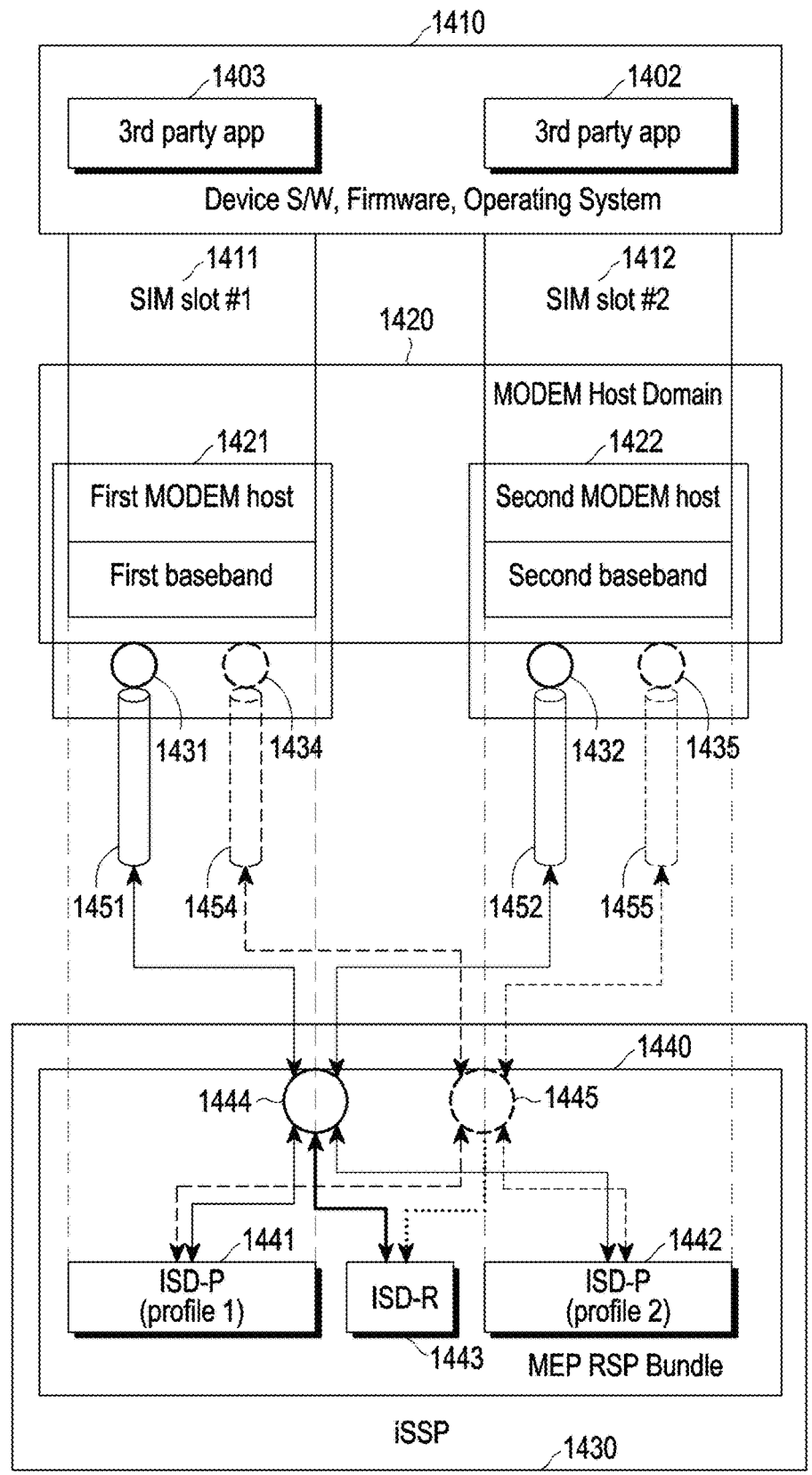
FIG. 14 is a diagram schematically illustrating still another example in which an eSIM bundle capable of simultaneously activating a plurality of profiles is connected to a multi-SIM MODEM in a terminal in a wireless communication system according to various embodiments of the disclosure.

FIG. 14 is a diagram schematically illustrating still another example in which an eSIM bundle capable of simultaneously activating a plurality of profiles is connected to a multi-SIM MODEM in a terminal in a wireless communication system according to various embodiments of the disclosure.

Referring to FIG. 14, a multi-SIM MODEM 1420 has two logical basebands, so the multi-SIM MODEM 1420 may support two communication lines at the same time.

In FIG. 14, the multi-SIM MODEM 1420 may support the same number of SIM slots as the number of logical basebands supported by the multi-SIM MODEM 1420. In FIG. 14, the multi-SIM MODEM 1420 supports two logical basebands, so there are also two SIM slots, and there may be two UICC APDU pipes 1451 and 1452 and two CAT APDU pipes 1454 and 1455 between the multi-SIM MODEM 1420 and an MEP RSP bundle 1440.

According to FIG. 14, the multi-SIM MODEM 1420 may form UICC APDU pipes as many as the number of SIM slots supported by the multi-SIM MODEM 1420 between the MEP RSP bundle 1440 and the multi-SIM MODEM 1420. FIG. 14 shows an embodiment in which the two UICC APDU pipes 1451 and 1452 are formed between the multi-SIM MODEM 1420 and the MEP RSP bundle 1440. In addition, FIG. 14 shows an embodiment in which the two CAT APDU pipes 1454 and 1455 are formed.

In FIG. 14, the multi-SIM MODEM 1420 may be referred to as a MODEM host domain. The MODEM host domain 1420 may include a plurality of MODEM hosts, e.g., a first MODEM host 1421 and a second MODEM host 1422. In FIG. 14, the first MODEM host 1421 may include a first baseband, and may include a UICC APDU application gate 1431 and a CAT APDU service gate 1434. In FIG. 14, the second MODEM host 1422 may include a second baseband, and may include a UICC APDU application gate 1432 and a CAT APDU service gate 1435. Unlike a multi-SIM MODEM 1220 in FIG. 12 and a multi-SIM MODEM 1320 in FIG. 13, the multi-SIM MODEM 1420 does not include an eSIM controller, so a function of the eSIM controller may be included in the MODEM hosts 1421 and 1422 which are included in the multi-SIM MODEM 1420.

Bundle and iSSP management software such as a third-party app such as a communication provider app within the terminal or a SIM card manager which is device software of managing communication profile setting, or an LBA/LPA may try to access an iSSP through an interface provided by the multi-SIM MODEM 1420 or to access and control a telecom bundle and an eSIM bundle within the iSSP.

The interface provided by the multi-SIM MODEM 1420 may be referred to as a SIM slot, and in FIG. 14, a device software or OS 1410 may access the multi-SIM MODEM 1420, or an iSSP 1430 or an MEP RSP bundle 1440 within the iSSP 1430 through a SIM slot #1 1411 and a SIM slot #2 1412. The MEP RSP bundle 1440 is a telecom bundle including an eUICC function defined in an eSIM standard of GSMA, and may include a plurality of communication profiles, e.g., a profile 1 1441 and a profile 2 1442. In addition, the MEP RSP bundle 1440 may include an ISD-R 1443 which processes a command transferred by an LBA or an LPA (not shown in FIG. 14) controlling the MEP RSP bundle 1440. The MEP RSP bundle 1440 may simultaneously activate communication profiles as many as communication profiles which the multi-SIM MODEM 1420 may simultaneously support, among the plurality of communication profiles 1441 and 1442.

According to FIG. 14, the multi-SIM MODEM 1420 may generate a plurality of UICC APDU pipes 1451 and 1452 and a plurality of CAT APDU pipes 1454 and 1455 between the multi-SIM MODEM 1420 and the MEP RSP bundle 1440. Here, the maximum number of UICC APDU pipes 1451 and 1452 which may be generated may be equal to the number of MODEM hosts 1421 and 1422 included in the multi-SIM MODEM 1420. In addition, the maximum number of CAT APDU pipes 1454 and 1455 which may be generated may be equal to the number of MODEM hosts 1421 and 1422 included in the multi-SIM MODEM 1420.

The first UICC APDU pipe 1451 may be generated between the first MODEM host 1421 of the multi-SIM MODEM 1220 and the MEP RSP bundle 1440. The first UICC APDU pipe 1451 may be generated between the UICC APDU application gate 1431 of the first MODEM host 1421 and the UICC APDU service gate 1444 of the MEP RSP bundle 1440.

The second UICC APDU pipe 1452 may be generated between the second MODEM host 1422 of the multi-SIM MODEM 1420 and the MEP RSP bundle 1440. The second UICC APDU pipe 1452 may be generated between the UICC APDU application gate 1432 of the second MODEM host 1422 and the UICC APDU service gate 1444 of the MEP RSP bundle 1440.

In FIG. 14, it may be assumed that the profile 1 1441 is connected to a first baseband of the first MODEM host 1421 and then activated, and the profile 1 1441 is accessible through the SIM slot #1 1411. It may be assumed that the profile 2 1442 is connected to a second baseband of the second MODEM 1422 and then activated, and the profile 2 1442 is accessible through the SIM slot #2 1412. In this case, a command of an LBA or an LPA for controlling the profile 1 1441 may be transferred through the SIM slot #1 1411 to be transferred to the ISD-R 1443 through the UICC APDU pipe 1451. In addition, a command of an LBA or an LPA for controlling the profile 2 1442 may be transferred through the SIM slot #2 1412 to be transferred to the ISD-R 1443 through the UICC APDU pipe 1452.

Figure 15:
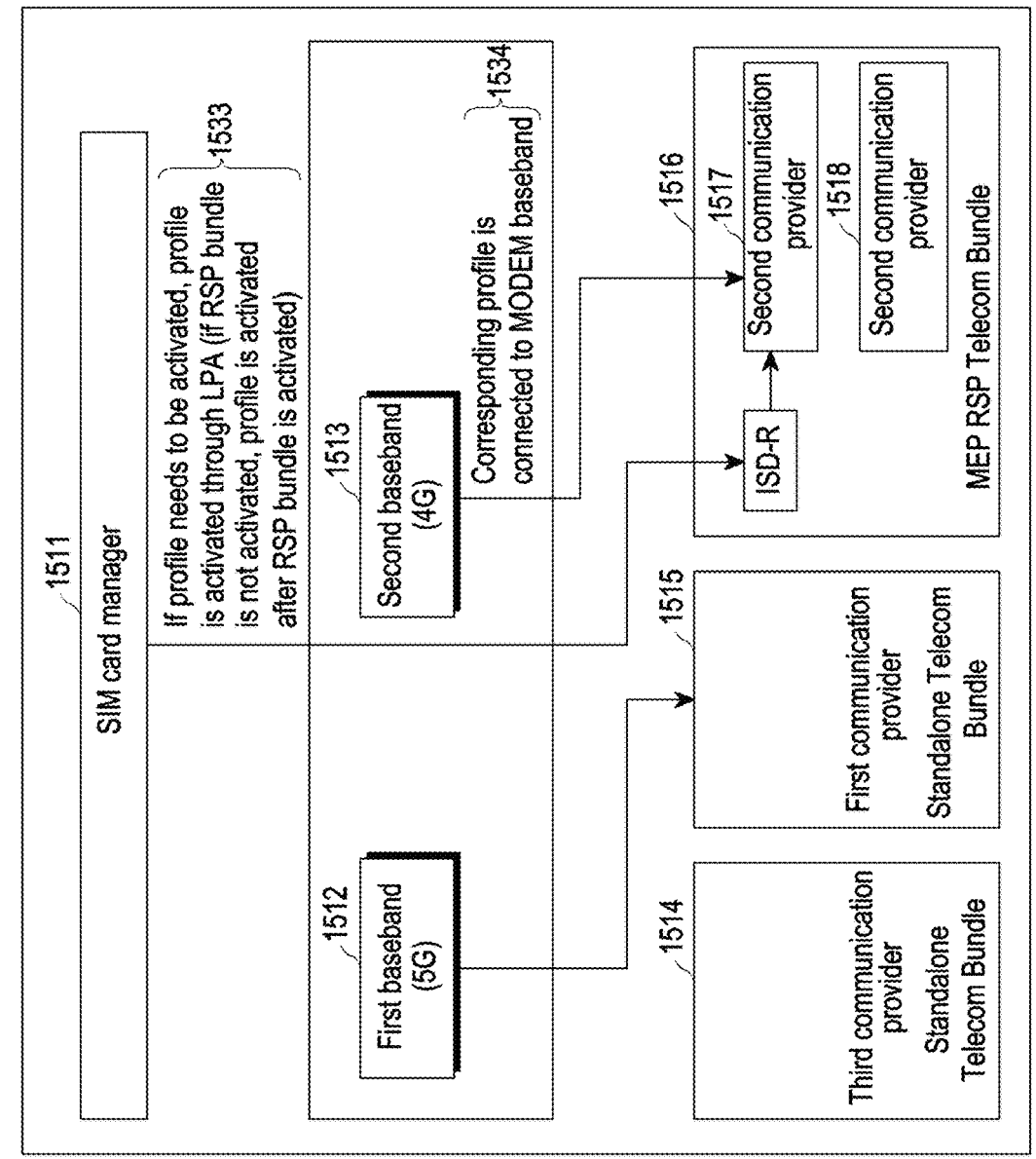
FIG. 15 is a diagram schematically illustrating an example of an operation in which terminal software controls a telecom bundle of an iSSP in a terminal in a wireless communication system according to embodiments of the disclosure.

FIG. 15 is a diagram schematically illustrating an example of an operation in which terminal software controls a telecom bundle of an iSSP in a terminal in a wireless communication system according to embodiments of the disclosure.

Referring to FIG. 15, an operation of controlling a telecom bundle of an iSSP by device software shown in FIG. 15 may be an operation in which a user request is detected through a UI of a terminal, and the device software controls the telecom bundle of the iSSP based on the user request.

FIG. 15 shows an example of a UI, i.e., a SIM card manager UI 1501 of a SIM card manager 1511 in a dual-SIM terminal 1500. In FIG. 15, a terminal is the dual-SIM terminal 1500, so a first SIM slot may be referred to as a primary slot 1502 and a second SIM slot may be referred to as a secondary slot 1503. Here, the primary slot 1502 may be connected to a baseband which may support up to 5G, and the primary slot 1502 may be using a communication service of a first communication provider.

In addition, a snapshot of the SIM card manager UI 1501 is a snapshot in a case that an installed subscriber list 1505 including profiles within a telecom bundle or an RSP bundle installed in an iSSP in the secondary slot 1503 is opened, and then a communication service of a second communication provider is selected.

In FIG. 15, a telecom bundle control operation which is based on user setting is performed based on four operations.

In operation 1531, a communication provider to be used in the primary slot 1502 and the secondary slot 1503 is selected through the SIM card manager UI 1501. In particular, a snapshot of the SIM card manager UI 1501 in FIG. 15 is a snapshot in a case that a communication provider to be activated in the secondary slot 1503 is selected as the second communication provider in the subscriber list 1505 in operation 1531.

According to operation 1532, the SIM card manager 1511 determines whether to activate a standalone telecom bundle, whether to activate a profile installed an RSP bundle, or whether to activate a profile installed in an MEP RSP bundle in order to use a communication service of a selected communication provider. In addition, in a case that a bundle or profile of a communication provider other than the communication provider selected through the SIM card manager UI 1501 in the secondary slot 1503 has been activated, the SIM card manager 1511 determines whether the activated bundle or profile needs to be deactivated. In an embodiment of the disclosure, in order to use the communication service of the second communication provider which is selected through the SIM card manager UI 1501, a second communication provider profile 1517 of an MEP RSP bundle 1516 needs to be activated. Accordingly, after activating the MEP RSP bundle 1516, the SIM card manager 1511 determines to sequentially perform an operation of activating the second communication provider profile 1517.

In operation 1533, the SIM card manager 1511 activates the MEP RSP bundle 1516 through an LBA. Thereafter, the SIM card manager 1511 activates the second communication provider profile 1517 by accessing an ISD-R of the MEP RSP bundle through an LPA and transferring an ES10c.EnableProfile command.

In operation 1534, the activated second communication provider profile 1517 is connected to a second base band 1513 which corresponds to the secondary slot 1503. Here, in operation 1534, when the MEP RSP bundle is activated, the second communication provider profile 1517 to be activated later may be automatically connected to the second baseband 1513 by activating the MEP RSP bundle in conjunction with the secondary slot 1503 or the second baseband 1513. Alternatively, in operation 1534, after being activated without being connected to a specific baseband, the MEP RSP bundle 1516 may activate the second communication provider profile 1517 by including a SIM port identifier of the secondary slot 1503 or information related to the second baseband 1513 in a command for activating the second communication provider profile 1517. Alternatively, in operation 1534, a UICC APDU pipe between the MEP RSP bundle 1516 and the second baseband 1513 may be generated and allocated to the second communication provider profile 1517.

Figure 16A:
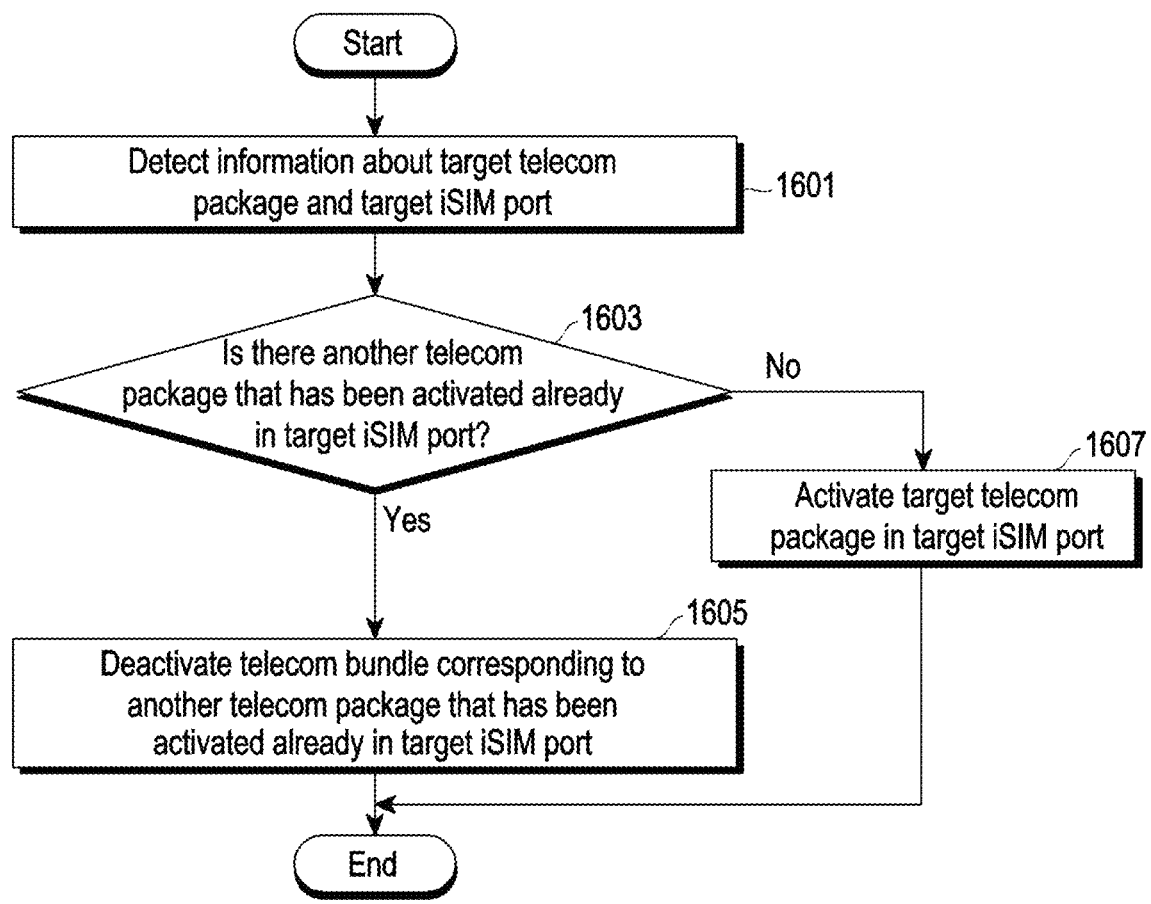
FIG. 16A is a flowchart schematically illustrating an example of an operation of determining whether to activate a telecom package in a terminal in a wireless communication system according to embodiments of the disclosure.

FIG. 16A is a flowchart schematically illustrating an example of an operation of determining whether to activate a telecom package in a terminal in a wireless communication system according to embodiments of the disclosure.

Referring to FIG. 16A, software of a terminal may be a SIM card manager which includes a function of an LBA or an LPA, and may access a MODEM to transfer a command in order to activate or deactivate a telecom package within an iSSP.

An operation of determining whether to activate a telecom package shown in FIG. 16A may be a specific operation in operation 1532 in FIG. 15.

In operation 1601, the terminal detects that information about a telecom package of a communication provider to be activated and an iSIM port in which the corresponding telecom package needs to be activated is inputted. The information about the telecom package of the communication provider to be activated and the iSIM port in which the corresponding telecom package needs to be activated may be inputted, for example, through a UI, the telecom package of the communication provider to be activated may be referred to as a target telecom package, and the iSIM port in which the target telecom package may be activated may be referred to as a target iSIM port.

In operation 1603, the terminal determines whether another telecom package which has been activated already exists in the target iSIM port detected in operation 1601. If the other telecom package which has been activated already exists in the target iSIM port, the terminal deactivates a telecom bundle which corresponds to the other telecom package already activated in the target iSIM port in operation 1605. That is, in operation 1605, the terminal deactivates a profile which corresponds to the other telecom package already activated in the target iSIM port regardless of whether the other telecom package already activated in the target iSIM port is included in a telecom bundle different from the telecom package to be activated, or whether the other telecom package already activated in the target iSIM port is included in the same telecom bundle as the telecom package to be activated.

Contrary to this, if there is no other telecom package already activated in the target iSIM port, the terminal activates the target telecom package in the target iSIM port in operation 1607. If the target telecom package is a telecom bundle, the terminal transfers, to an iSSP, an Si3 command for activating the corresponding telecom bundle in the target iSIM port. If the target telecom package is a profile, the terminal determines whether an eSIM bundle including the target telecom package is activated. If the eSIM bundle including the target telecom package is not activated, the terminal activates the eSIM bundle and then activates the target telecom package.

Figure 16B:
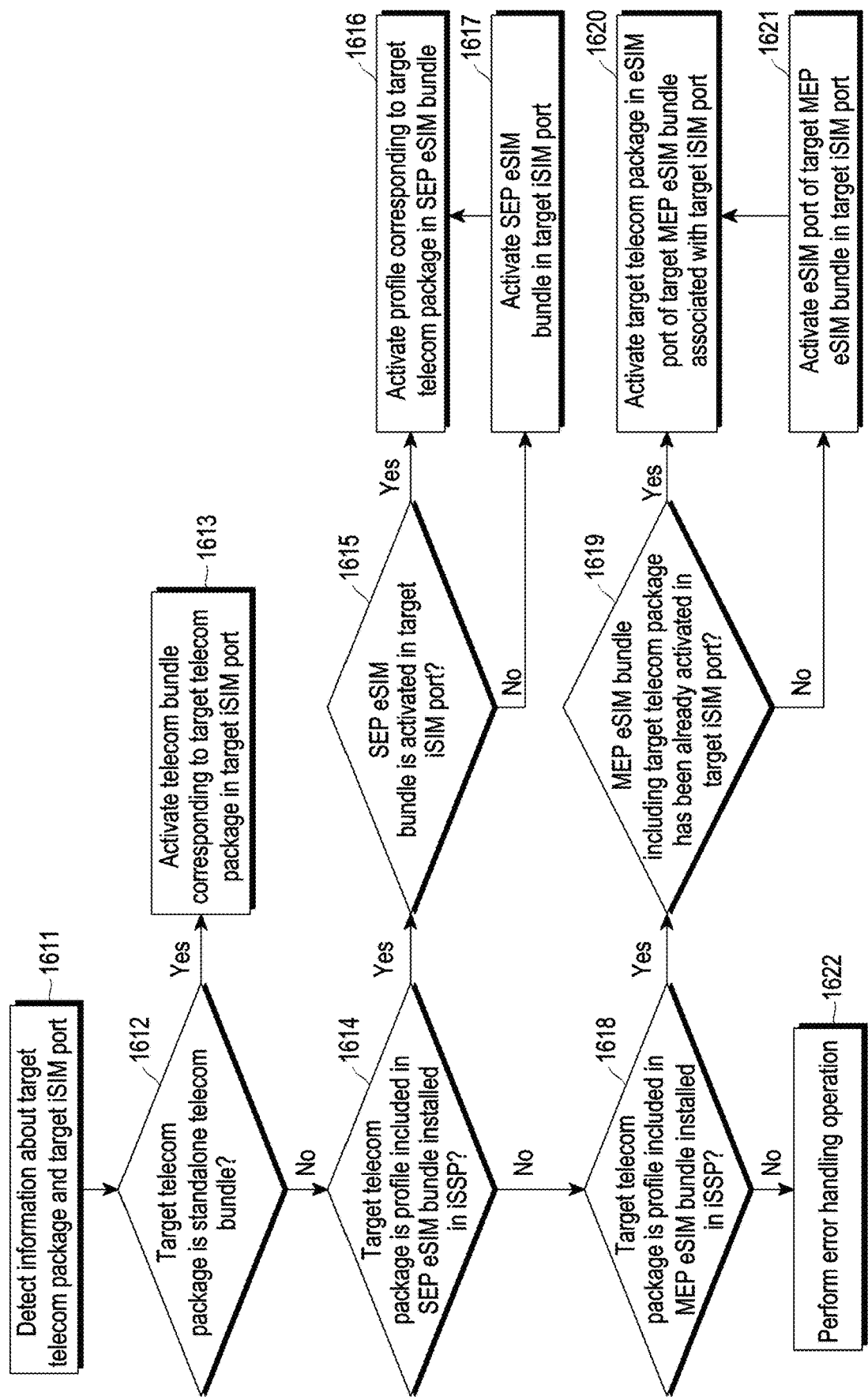
FIG. 16B is a flowchart schematically illustrating another example of an operation of determining whether to activate a telecom package in a terminal in a wireless communication system according to embodiments of the disclosure.

FIG. 16B is a flowchart schematically illustrating another example of an operation of determining whether to activate a telecom package in a terminal in a wireless communication system according to embodiments of the disclosure.

Referring to FIG. 16B, software of a terminal includes a function of an LBA or an LPA, and may be a SIM card manager which may access a MODEM and transfer a command in order to activate or deactivate a telecom package within an iSSP. In operation 1611, the terminal detects that information about a telecom package to be activated and an iSIM port in which the corresponding telecom package needs to be activated is inputted. Here, the information about the telecom package to be activated and the iSIM port in which the corresponding telecom package needs to be activated may be inputted through, for example, a UI, the telecom package to be activated may be referred to as a target telecom package, and the iSIM port in which the target telecom package may be activated may be referred to as a target iSIM port.

In operation 1612, the terminal determines whether the target telecom package is a standalone telecom bundle. Here, the standalone telecom bundle may not be an eSIM bundle, but a telecom bundle which may be one telecom package itself.

If the target telecom package is the standalone telecom bundle, in operation 1613, a telecom bundle which corresponds to the target telecom package is activated in a target iSIM port. In operation 1613, if there is another telecom bundle which has been already activated in the target iSIM port, the terminal may deactivate the telecom bundle which has been already activated. That is, in operation 1613, if there is the other telecom bundle which has been already activated in the target iSIM port, the terminal deactivates the telecom bundle which has been already activated and then activates a telecom bundle which corresponds to the target telecom package in the target iSIM port.

If the target telecom package is not the standalone telecom bundle, in operation 1614, the terminal determines whether the target telecom package is a profile included in a single enabled profile (SEP) eSIM bundle installed in the iSSP. Here, the SEP eSIM bundle may be an eSIM bundle without an MEP function.

If the target telecom package is the profile included in the SEP eSIM bundle, in operation 1615, the terminal determines whether the corresponding SEP eSIM bundle is activated in the target iSIM port.

If the corresponding SEP eSIM bundle is activated in the target iSIM port, in operation 1616, the terminal transfers, to the SEP eSIM bundle, an ES10c.EnableProfile command for activating a profile which corresponds to the target telecom package to activate the corresponding profile.

Alternatively, if the corresponding SEP eSIM bundle is not activated in the target iSIM port, in operation 1617, the UE activates the SEP eSIM bundle in the target iSIM port. In operation 1617, if there is the other telecom bundle which has been already activated in the target iSIM port, the terminal may deactivate the telecom bundle has been already activated. That is, in operation 1617, if there is the other telecom bundle which has been already activated in the target iSIM port, the terminal deactivates the telecom bundle has been already activated and then activates the SEP eSIM bundle in the target iSIM port. Then, the terminal activates the target telecom package again in operation 1616.

Alternatively, if the target telecom package is neither the standalone telecom bundle nor the profile included in the SEP eSIM bundle, in operation 1618, the terminal determines whether the target telecom bundle is a profile included in an MEP eSIM bundle installed in the iSSP.

If the target telecom bundle is the profile included in the MEP eSIM bundle installed in the iSSP, in operation 1619, the terminal determines whether an MEP eSIM bundle including the target telecom package has been already activated in the target iSIM port. In operation 1619, the terminal determines whether one of eSIM ports generated by the MEP eSIM bundle is connected to the target iSIM port.

If the MEP eSIM bundle including the target telecom package has been already activated in the target iSIM port, or if one of the eSIM ports generated by the MEP eSIM bundle is connected to the target iSIM port, in operation 1620, the terminal activates the target telecom package in an eSIM port of a target MEP eSIM bundle associated with the target iSIM port. Here, a command used for activating the target telecom package in the eSIM port of the target MEP eSIM bundle associated with the target iSIM port may be ES10c.EnableProfile (a profile identifier corresponding to the target telecom, and an eSIM port identifier associated with the target iSIM port).

Alternatively, if the MEP eSIM bundle including the target telecom package is deactivated in the target iSIM port or the eSIM port generated by the MEP eSIM bundle is not connected to the target iSIM port, in operation 1621, the terminal activates the eSIM port of the target MEP eSIM bundle in the target iSIM port. In operation 1621, if the target MEP eSIM bundle is deactivated, the terminal may activate the target MEP eSIM bundle.

If the target telecom bundle is not the profile included in the MEP eSIM bundle installed in the iSSP, in operation 1622, the terminal may not match the target telecom package to any telecom bundle or profile installed in the iSSP, so the terminal performs an error handling operation.

Figure 17:
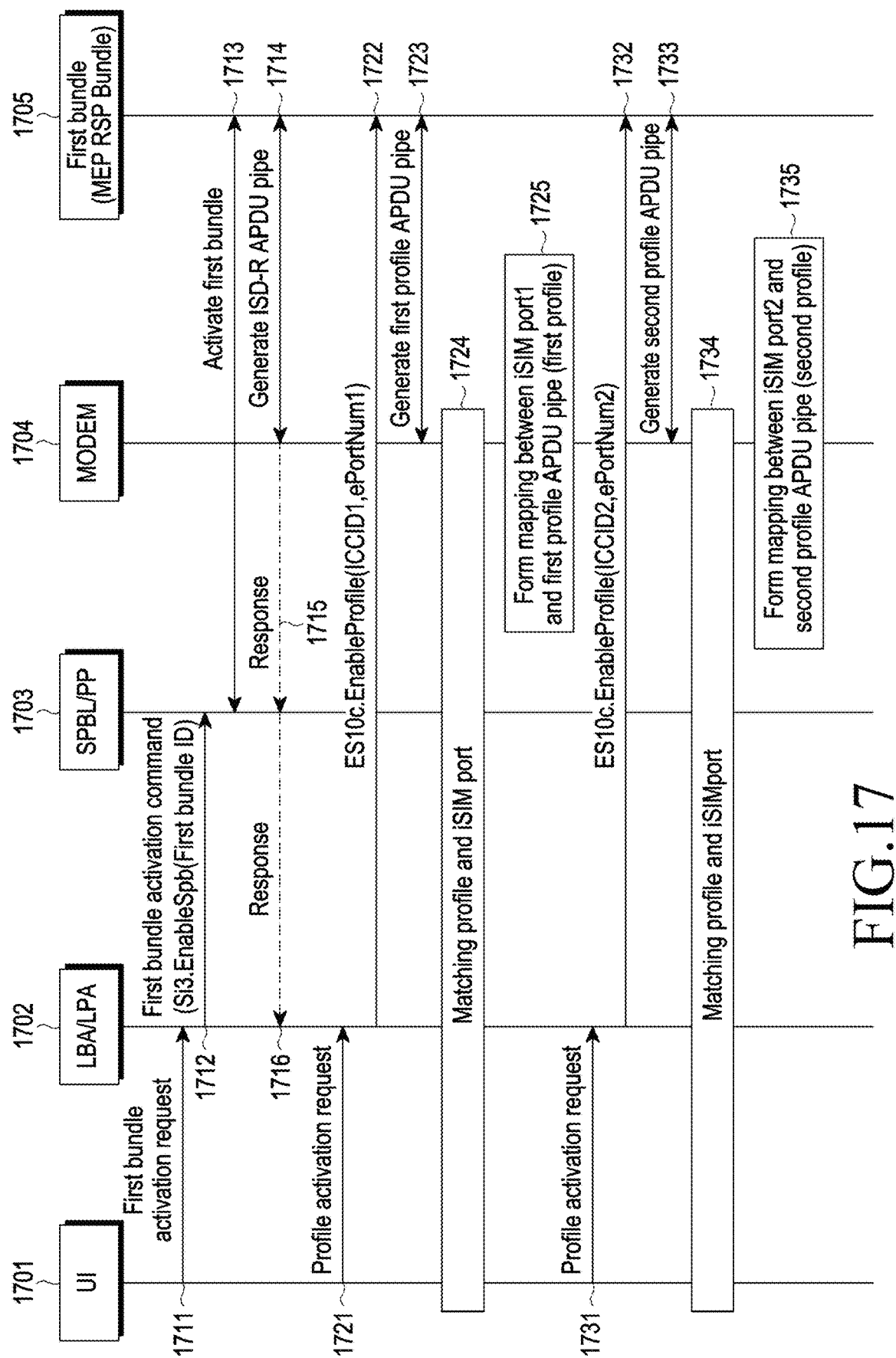
FIG. 17 is a diagram schematically illustrating an operation of activating a telecom bundle or a profile installed in the telecom bundle in a terminal in a wireless communication system according to embodiments of the disclosure.

FIG. 17 is a diagram schematically illustrating an operation of activating a telecom bundle or a profile installed in the telecom bundle in a terminal in a wireless communication system according to embodiments of the disclosure.

Referring to FIG. 17, an LBA/LPA 1702 may represent device software (or terminal software) including functions of an LBA and an LPA. In FIG. 17, an SPBL/PP 1703 may be an entity which collectively refers to an SPBL and a PP within an iSSP which may manage a telecom bundle installed in the iSSP. In FIG. 17, a MODEM 1704 may be a multi-SIM MODEM, and a first bundle 1705 may be an MEP RSP bundle capable of activating a plurality of profiles. Although not shown in FIG. 17, a first iSIM port and a second iSIM port may be associated with a first logical baseband and a second logical baseband of the multi-SIM MODEM 1704, respectively.

An operation illustrated in FIG. 17 may be an operation of activating a first profile and a second profile included in a first bundle to the first iSIM port and the second iSIM port, respectively. In FIG. 17, it may be assumed that a first eSIM port and a second eSIM port of the first bundle are connected to the first iSIM port and the second iSIM port, respectively, and an iSIM port connected to an ISD-R APDU pipe of the first bundle is a third iSIM port.

In operation 1711, a UI 1701 may be a SIM card manager UI of a terminal, and transfers a first bundle activation command to the LBA/LPA 1702 upon detecting a first bundle activation request. Here, an input detected in the UI 1701 assumes, for example, a case in which a communication provider line selected in the SIM card manager UI is associated with the first bundle.

Alternatively, it may be noted that operation 1711 may be instead performed by a SIM card manager as described in FIG. 16A or FIG. 16B corresponding to the detected first bundle activation request.

In operation 1712, the LBA/LPA 1702 receiving the first bundle activation command from the UI 1701 transfers a first bundle activation command to the SPBL/PP 1703. The first bundle activation command may be Si3.EnableSpb. Alternatively, the first bundle activation command may include a bundle identifier of the first bundle.

In operation 1713, the SPBL/PP 1703 receiving the first bundle activation command from the LBA/LPA 1702 activates the first bundle 1705. The corresponding activation operation may be an operation in which the encrypted first bundle 1705 is decrypted within the iSSP and a state thereof is converted into a usable state.

In operation 1714, the multi-SIM MODEM 1704 and the first bundle 1705 generate an ISD-R APDU pipe. The ISD-R APDU pipe may be a UICC APDU pipe used for transferring a command to the ISD-R within the first bundle 1705.

In operation 1715, the multi-SIM MODEM 1704 may transfer a response informing that operations 1713 and 1714 are normally performed to the SPBL/PP 1703. For example, in operation 1715, the multi-SIM MODEM 1704 may transfer, to the SPBL/PP 1703, a response informing that the first bundle 1705 is activated and the ISD-R APDU pipe is generated.

In operation 1716, the SPBL/PP 1703 may inform the LBA/LPA 1702 that operations 1713 and 1714 are normally performed. For example, the SPBL/PP 1703 may transfer, to the LBA/LPA 1702, a response informing that the first bundle 1705 is activated and the ISD-R APDU pipe is generated in operation 1716. In operation 1716, the LBA/LPA 1702 may receive an identifier of the iSIM port connected to the ISD-R APDU pipe. The information received by the LBA/LPA 1702 may be any information capable of identifying the iSIM port.

In operation 1721, the UI 1701 may detect a profile activation request, and accordingly transfer a profile activation command to the LBA/LPA 1702. For example, operation 1721 may be an operation of activating a profile in the first iSIM port. Also, it may be noted that operation 1721 may be instead performed by the SIM card manager as described in FIG. 16A or FIG. 16B in response to the detected profile activation request. Alternatively, if information about which profile to be activated according to the input detected in operation 1711 is transferred to the LBA/LPA 1702, operation 1721 may be omitted.

In operation 1722, the LBA/LPA 1702 may transfer a profile activation command to the first bundle 1705. The profile activation command may be ES10c.EnableProfile. The profile activation command may include an identifier of a profile to be activated and an identifier of an eSIM port in which the profile may be activated. The profile activation command may be transferred through the multi-SIM MODEM 1704.

In operation 1723, a profile APDU pipe (a first profile APDU pipe) may be formed between the multi-SIM MODEM 1704 and the first bundle 1705. The first profile APDU pipe may be a UICC APDU pipe capable of transferring an APDU to a profile. The first profile APDU pipe may be a UICC APDU pipe connected to an eSIM port identified by the identifier of the eSIM port included in operation 1722. In FIG. 17, the first profile APDU pipe may be connected to the first eSIM port of the first bundle 1705.

According to operation 1724, a process of matching the profile activated in operation 1722 to the target iSIM port may be performed. In operation 1724, the LBA/LPA 1702 may transfer, to the multi-SIM MODEM 1704, an identifier of an iSIM port to which the profile activated in operation 1722 may be connected.

In operation 1725, the first iSIM port (iSIMport1) and the first profile APDU pipe may be connected. Operation 1725 may be an operation of connecting the identifier of the first profile APDU pipe generated in operation 1723 with the identifier of the first iSIM port identifier to manage the same inside the multi-SIM MODEM 1704.

Operations 1731, 1732, 1733, 1734, and 1735 may be an operation of activating another profile included in the first bundle 1705 in the second iSIM port (iSIMport2).

In operation 1731, the UI 1701 detects a profile activation request to activate the second profile in the second iSIM port, and transfers a profile activation command to the LBA/LPA 1702 correspondingly. Here, the profile activation request detected in operation 1731 may be a request to use a communication provider line which corresponds to the profile 2 in a location which corresponds to the iSIM port 2.

In operation 1732, the LBA/LPA 1702 may transfer, to the first bundle 1705, a command to activate the profile 2 in the eSIM port 2. The corresponding command may be ES10c.EnableProfile. The corresponding command may include an identifier of the profile to be activated and an identifier of an eSIM port in which the profile may be activated.

In operation 1733, a second profile APDU pipe may be generated between the multi-SIM MODEM 1704 and the first bundle 1705. The second profile APDU pipe may be a UICC APDU pipe connected to the eSIM port identified by the identifier of the eSIM port included in operation 1732. In FIG. 17, the second profile APDU pipe may be connected to the second eSIM port of the first bundle 1705.

In operation 1734, the second profile and the second iSIM port may be matched. Operation 1734 may be an operation of matching the second profile and the second eSIM port in which the second profile may be activated. Operation 1734 may be an operation in which the LBA/LPA 1702 transfers, to the multi-SIM MODEM 1704, an identifier of the second profile, the second eSIM port, or the second profile APDU pipe.

In operation 1735, the multi-SIM MODEM 1704 may connect the second iSIM port and the second profile APDU pipe. Operation 1735 may be an operation of connecting the identifier of the second iSIM port with the identifier of the second profile APDU pipe generated in operation 1733 to manage the same inside the multi-SIM MODEM 1704.

Figure 18:
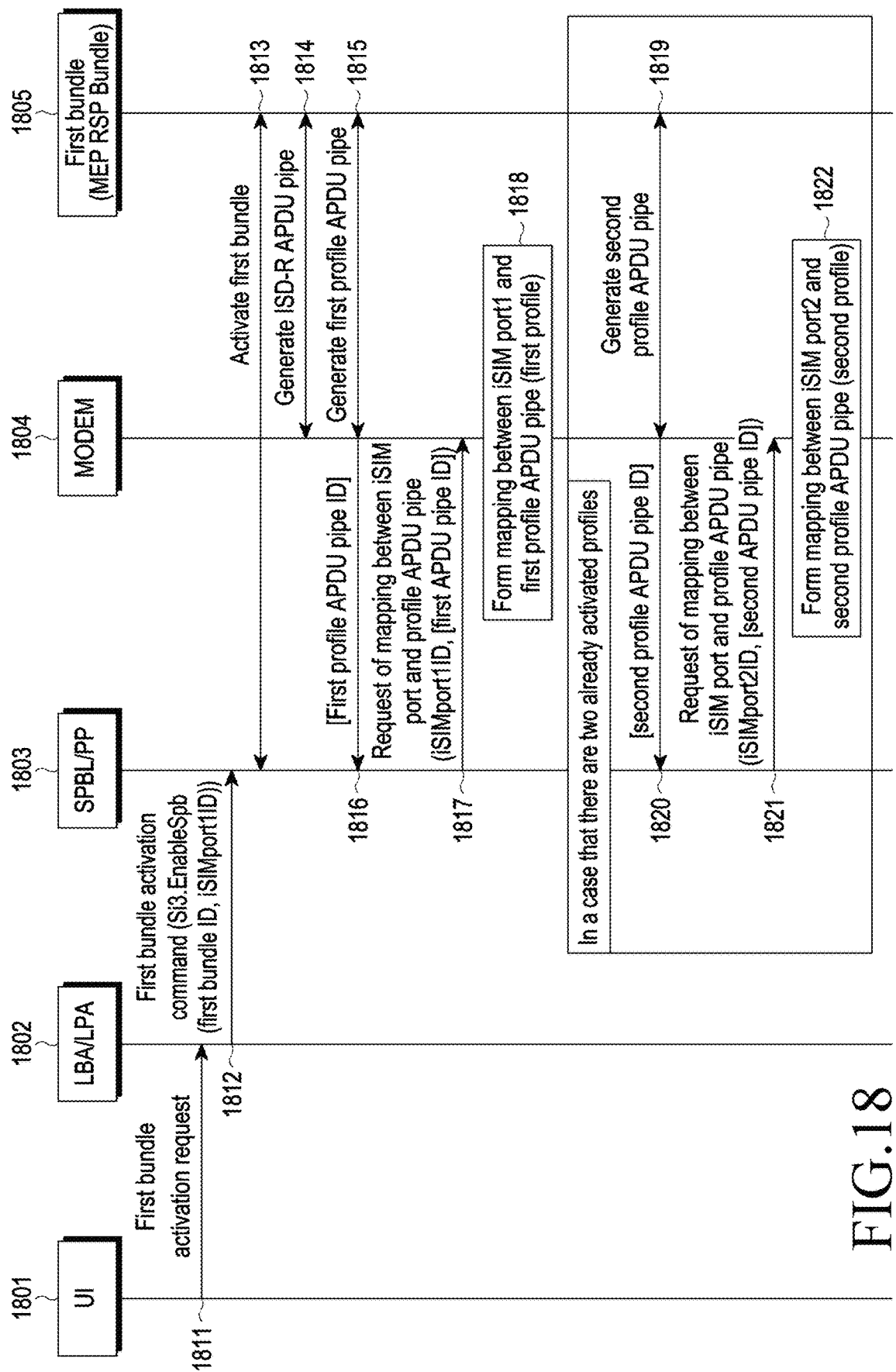
FIG. 18 is a diagram schematically illustrating an operation of activating an MEP RSP bundle to connect the MEP RSP bundle to an iSIM port in a terminal in a wireless communication system according to embodiments of the disclosure.

FIG. 18 is a diagram schematically illustrating an operation of activating an MEP RSP bundle to connect the MEP RSP bundle to an iSIM port in a terminal in a wireless communication system according to embodiments of the disclosure.

Referring to FIG. 18, a UI 1801, an LBA/LPA 1802, an SPBL/PP 1803, a multi-SIM MODEM 1804, and a first bundle 1805 may correspond to a UI 1701, an LBA/LPA 1702, an SPBL/PP 1703, a multi-SIM MODEM 1704, and a first bundle 1705 in FIG. 17, respectively.

An operation illustrated in FIG. 18 may be an operation in which the first bundle 1805 is activated by an input detected through the UI 1801. In FIG. 18, the first bundle 1805 may be an MEP RSP bundle, and it may be assumed that two already activated profiles (e.g., a first profile and a second profile) are activated in a first eSIM port and a second eSIM port, respectively.

Accordingly, according to an embodiment shown in FIG. 18, as the first bundle 1805 is activated, the first profile and the second profile included in the first bundle 1805 may be automatically activated.

In FIG. 18, as the first bundle 1805 is activated, the first profile and the second profile included in the first bundle 1805 may be connected to the first iSIM port and the second iSIM port, respectively.

In FIG. 18, the first bundle 1805 may activate a plurality of eSIM ports with the multi-SIM MODEM 1804, and it may be assumed that the first eSIM port and the second eSIM port are connected to the first iSIM port and the second iSIM port, respectively. In FIG. 18, it may be assumed that an iSIM port connected to an ISD-R APDU pipe of the first bundle 1805 is a third iSIM port.

In operation 1811, the UI 1801 may be a SIM card manager UI of a terminal, and transfers a first bundle activation command to the LBA/LPA 1802 upon detecting a first bundle activation request. Here, the first bundle activation request detected in the UI 1801 assumes, for example, a case that a communication provider line selected in the SIM card manager UI of the terminal is associated with the first bundle 1805.

Alternatively, it may be noted that operation 1811 may be instead performed by the SIM card manager as described in FIG. 16A or FIG. 16B corresponding to the detected first bundle activation request.

In operation 1812, the LBA/LPA 1802 receiving the first bundle activation command from the UI 1801 transfers the first bundle activation command to the SPBL/PP 1803. The first bundle activation command may be Si3.EnableSpb. The first bundle activation command may include a bundle identifier of the first bundle 1805. The first bundle activation command may further include an identifier of an iSIM port. In operation 1812, it may be assumed that the identifier of the iSIM port is included in the first bundle activation command.

In operation 1813, the SPBL/PP 1803 activates the first bundle 1805. The activation operation in operation 1813 may be an operation in which the encrypted first bundle 1805 is decrypted within the iSSP and a state thereof is converted into a usable state.

In operation 1814, an ISD-R APDU pipe is formed between the multi-SIM MODEM 1804 and the first bundle 1805. The ISD-R APDU pipe may be a UICC APDU pipe used for transferring a command to an ISD-R within the first bundle 1805.

In operation 1815, a profile APDU pipe (a first profile APDU pipe) may be generated between the multi-SIM MODEM 1804 and the first bundle 1805. The first profile APDU pipe may be a UICC APDU pipe capable of transferring an APDU through the first eSIM port. The first profile APDU pipe may be connected to the first eSIM port of the first bundle 1805. Here, operation 1815 may be a part of an operation of forming the first eSIM port.

In operation 1816, the multi-SIM MODEM 1804 may transfer, to the SPBL/PP 1803, an identifier of the first profile APDU pipe generated in operation 1815.

In operation 1817, the SPBL/PP 1803 may transfer, to the multi-SIM MODEM 1804, the identifier of the iSIM port received in operation 1812 and an APDU pipe identifier received in operation 1815 to request mapping between the iSIM port and the APDU pipe.

In operation 1818, the multi-SIM MODEM 1804 may form mapping between the identifier of the iSIM port and the APDU pipe identifier which are received in operation 1817. Operation 1818 may be an operation of mapping an iSIM port identified by the received identifier and the eSIM port and the APDU pipe which are formed in operation 1815.

If there are two already activated profiles in the first bundle 1805, operations 1819, 1820, 1821, and 1822 may be further performed. Operations 1819, 1820, 1821, and 1822 may be an operation of connecting the second profile APDU pipe to the second eSIM port and activating the second profile in the second eSIM port.

Here, operations 1819, 1820, 1821, and 1822 may correspond to operations 1815, 1816, 1817, and 1818, respectively. This will be described in detail as follows.

In operation 1819, a profile APDU pipe (a second profile APDU pipe) may be generated between the multi-SIM MODEM 1804 and the first bundle 1805. The second profile APDU pipe may be a UICC APDU pipe capable of transferring an APDU through the second eSIM port. The second profile APDU pipe may be connected to the second eSIM port of the first bundle 1805. Here, operation 1819 may be a part of an operation of forming the second eSIM port.

In operation 1820, the multi-SIM MODEM 1804 may transfer an identifier of the second profile APDU pipe generated in operation 1819 to the SPBL/PP 1803.

In operation 1821, the SPBL/PP 1803 may transfer, to the multi-SIM MODEM 1804, the identifier of the iSIM port received in operation 1812 and the identifier of the APDU pipe received in operation 1819 to request mapping of the iSIM port and the APDU pipe.

In operation 1822, the multi-SIM MODEM 1804 may form mapping between the identifier of the iSIM port and the identifier of the APDU pipe which are received in operation 1821. Operation 1822 may be an operation of mapping the iSIM port identified by the received identifier and the eSIM port and the APDU pipe which are formed in operation 1819.

Figure 19:
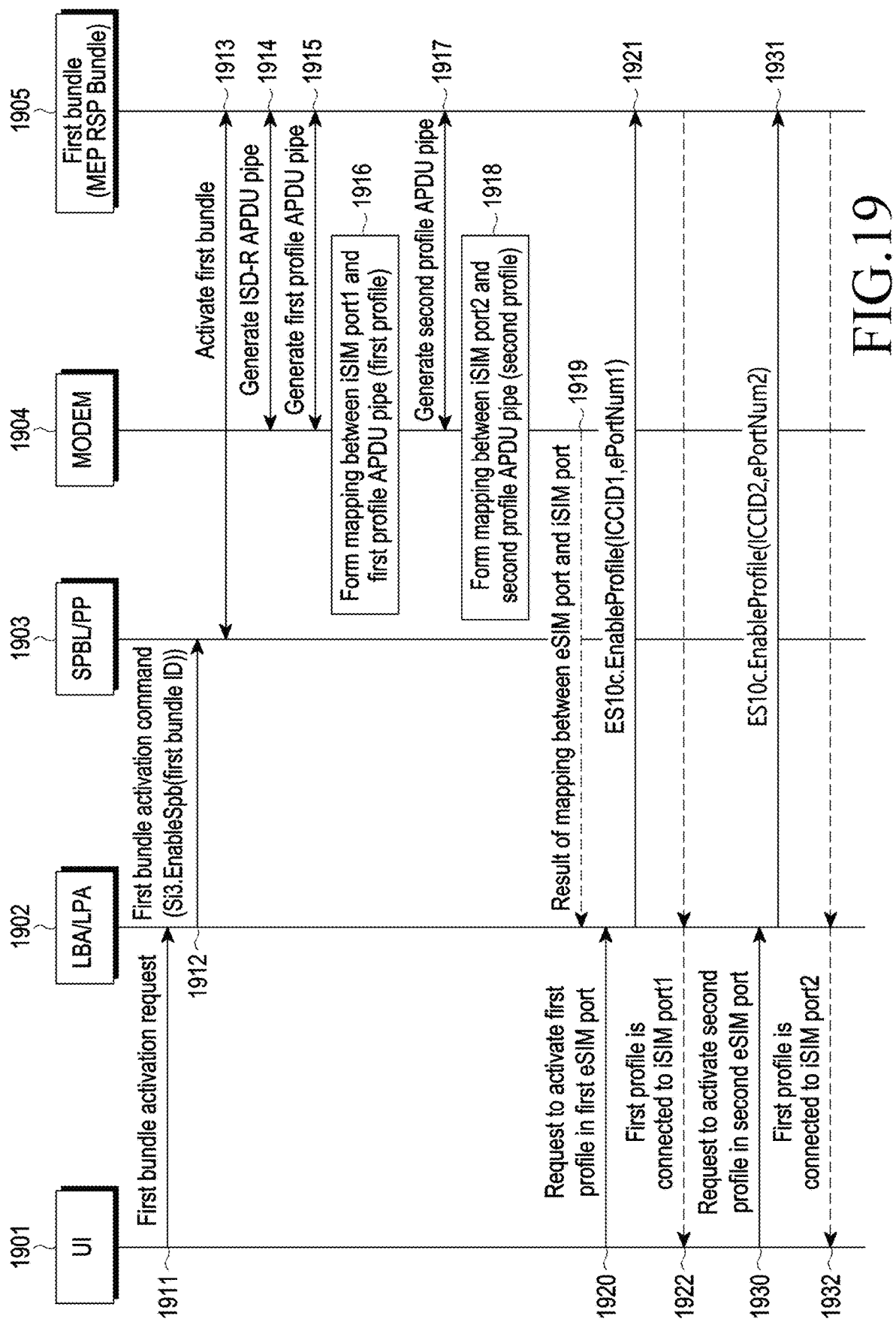
FIG. 19 is a diagram schematically illustrating an operation of activating an MEP RSP bundle to connect the MEP RSP bundle to an iSIM port, and activating a profile in each iSIM port in a terminal in a wireless communication system according to embodiments of the disclosure.

FIG. 19 is a diagram schematically illustrating an operation of activating an MEP RSP bundle to connect the MEP RSP bundle to an iSIM port, and activating a profile in each iSIM port in a terminal in a wireless communication system according to embodiments of the disclosure.

In FIG. 19, a UI 1901, an LBA/LPA 1902, an SPBL/PP 1903, a multi-SIM MODEM 1904, and a first bundle 1905 may correspond to a UI 1701, an LBA/LPA 1702, an SPBL/PP 1703, a multi-SIM MODEM 1704, and a first bundle 1705 in FIG. 17.

An operation illustrated in FIG. 19 may be an operation in which the first bundle 1905 which is an MEP RSP bundle is activated, an ISD-R APDU pipe is generated, and two profile APDU pipes are additionally generated. An operation shown in FIG. 19 may be an operation in which the multi-SIM MODEM 1904 includes two logical basebands, so the multi-SIM MODEM 1904 forms up to two profile APDU pipes with the first bundle 1905.

In FIG. 19, it may be assumed that a first eSIM port and a second eSIM port are connected to a first iSIM port and a second iSIM port, respectively. Alternatively, in FIG. 19, it may be assumed that an iSIM port connected to the ISD-R APDU pipe of the first bundle 1905 is a third iSIM port.

M operation 1911, the UI 1901 transfers a first bundle activation command to the LBA/LPA 1902. Here, a first bundle activation request detected in the UI 1801 assumes, for example, a case that a communication provider line selected in the SIM card manager UI of the terminal is associated with the first bundle 1805.

Alternatively, it may be noted that operation 1911 may be instead performed by the SIM card manager as described into FIG. 16A or FIG. 16B corresponding to the detected first bundle activation request.

In operation 1912, the LBA/LPA 1902 receiving the first bundle activation command from the UI 1901 transfers the first bundle activation command to the SPBL/PP 1903. The first bundle activation command may be Si3.EnableSpb.

In operation 1913, the SPBL/PP 1903 activates the first bundle 1905. The activation operation in operation 1913 may be an operation in which the encrypted first bundle 1905 is decrypted within the iSSP and a state thereof is converted into a usable state.

In operation 1914, the multi-SIM MODEM 1904 and the first bundle 1905 forms an ISD-R APDU pipe. The ISD-R APDU pipe may be a UICC APDU pipe used for transferring a command to an ISD-R within the first bundle 1905.

In operation 1915, a first profile APDU pipe may be formed between the multi-SIM MODEM 1904 and the first bundle 1905. The first profile APDU pipe may be a UICC APDU pipe capable of transferring an APDU through the first eSIM port. The first profile APDU pipe may be connected to the first eSIM port of the first bundle 1905. Here, operation 1915 may be a part of an operation in which the first bundle 1905 forms the first eSIM port with the multi-SIM MODEM 1904.

In operation 1916, the multi-SIM MODEM 1904 may map the first iSIM port and the first profile APDU pipe generated in operation 1915.

In operation 1917, a second profile APDU pipe may be formed between the multi-SIM MODEM 1904 and the first bundle 1905. The second profile APDU pipe may be a UICC APDU pipe capable of transferring an APDU through the second eSIM port. The second profile APDU pipe may be connected to the second eSIM port of the first bundle 1905. Operation 1917 may be a part of an operation in which the first bundle 1905 activates the second eSIM port with the multi-SIM MODEM 1904.

An operation including operations 1915 and 1916 may be referred to as an operation of activating a first eSIM port, and an operation including operations 1917 and 1918 may be referred to as an operation of activating a second eSIM port.

An embodiment in FIG. 19 shows an example of activating two eSIM ports (a first eSIM port and a second eSIM port), but in a case of a multi-SIM MODEM and an MEP RSP bundle which are capable of forming n eSIM ports, up to n eSIM ports may be activated. Each eSIM port activation procedure repeats an operation similar to operations 1915 and 1916 to form a UICC APDU pipe and connect the UICC APDU pipe to the iSIM port.

In operation 1919, the multi-SIM MODEM 1904 transfers information of the eSIM port activated in the first bundle 1905 to the LBA/LPA 1902. The corresponding information may include the number of activated eSIM ports and identifiers of iSIM ports which are connected to the activated eSIM ports, respectively. Based on the corresponding information, the LBA/LPA 1902 may identify which eSIM port to use for activating a profile in a specific iSIM port. Also, in operation 1919, an identifier of the iSIM port associated with the ISD-R APDU pipe generated in operation 1914 may be transferred. The LBA/LPA 1902 may identify which iSIM port needs to be used for accessing the ISD-R of the first bundle 1905 based on the identifier of the iSIM port associated with the ISD-R APDU pipe.

Operations 1920, 1921, and 1922 may be an operation of activating the first profile in the first eSIM port of the first bundle 1905. In FIG. 19, the first eSIM port may be associated with the first iSIM port.

In operation 1920, a request to activate the first profile in the first eSIM port is detected through the UI 1901. Here, the corresponding request may be the same as a request for activating the first profile in the first iSIM port.

In operation 1921, the LBA/LPA 1902 transfers, to the first bundle 1905, a command for activating the first profile in the first eSIM port. In operation 1921, the command may be transferred to the first bundle 1905 by using an iSIM port associated with the ISD-R APDU pipe formed in operation 1914. The corresponding command may include an identifier of a profile to be activated and an identifier of an eSIM port in which the profile may be activated.

In operation 1922, if the profile is normally activated in the eSIM port of the first bundle 1905, the first bundle 1905 may inform that the corresponding request, i.e., the request for activating the first profile in the first eSIM port has been normally performed. Through operation 1922, the LBA/LPA 1902 may identify that the profiled included in the command requested in operation 1921 has been normally activated in the eSIM port included in the command, and the eSIM port is connected to which iSIM port.

Operations 1930, 1931, and 1932 may be an operation of activating the second profile in the second eSIM port of the first bundle 1905. In FIG. 19, the second eSIM port may be associated with the second iSIM port.

In operation 1930, the UI 1901 detects a request to activate the second profile in the second eSIM port. The corresponding request may be the same as a request for activating the second profile in the second iSIM port.

In operation 1931, the LBA/LPA 1902 transfers, to the first bundle 1905, a command for activating the second profile in the second eSIM port. In operation 1931, the command may be transferred to the first bundle 1905 by using the iSIM port associated with the ISD-R APDU pipe formed in operation 1914. The corresponding command may include an identifier of a profile to be activated and an identifier of an eSIM port in which the profile may be activated.

In operation 1932, if the profile is normally activated in the eSIM port of the first bundle 1905, the first bundle 1905 may inform that the request for activating the second profile in the second eSIM port has been normally performed. In operation 1932, the LBA/LPA 1902 may identify that the profile included in the command requested in operation 1931 has been normally activated in the eSIM port included in the command, and the corresponding eSIM port is connected to which iSIM port.

Figure 20:
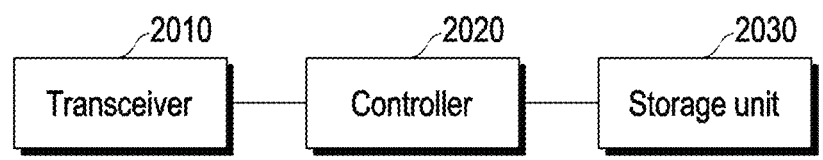
FIG. 20 is a diagram schematically illustrating an internal structure of a terminal in a wireless communication system according to various embodiments of the disclosure.

FIG. 20 is a diagram schematically illustrating an internal structure of a terminal in a wireless communication system according to various embodiments of the disclosure.

Referring to FIG. 20, a terminal may include a transceiver 2010, a controller 2020, and a storage unit 2030.

The controller 2020 controls the overall operation of the terminal, in particular, controls an operation related to an operation of managing a telecom bundle and a telecom profile in a wireless communication system according to embodiments of the disclosure. The operation of managing the telecom bundle and the telecom profile in the wireless communication system according to embodiments of the disclosure has been described in FIGS. 1 to 19, so a detailed description thereof will be omitted herein.

The transceiver 2010 transmits various signals and various messages to other devices included in the wireless communication system under the control of the controller 2020. Here, the various signals and the various messages transmitted by the transceiver 2010 have been described in FIGS. 1 to 19, so a detailed description thereof will be omitted herein.

The transceiver 2010 receives various signals and various messages from the other devices included in the wireless communication system under the control of the controller 2020. Here, the various signals and the various messages received by the transceiver 2010 have been described in FIGS. 1 to 19, so a detailed description thereof will be omitted herein.

The storage unit 2030 stores programs, various data, and/or the like related to the operation of managing the telecom bundle and the telecom profile in the wireless communication system according to embodiments of the disclosure under the control of the controller 2020.

The storage unit 2030 stores the various signals and the various messages received by the transceiver 2010 from the other devices.

Meanwhile, a case in which the terminal is implemented as separate units such as the transceiver 2010, the controller 2020, and the storage unit 2030 has been illustrated in FIG. 20, however, the terminal may be implemented with a form in which at least two of the transceiver 2010, the controller 2020, and the storage unit 2030 are integrated. Also, the terminal may be implemented with at least one processor.

Figure 21:
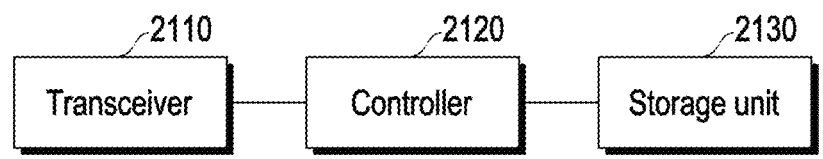
FIG. 21 is a diagram schematically illustrating an internal structure of a smart secure medium in a wireless communication system according to various embodiments of the disclosure.

FIG. 21 is a diagram schematically illustrating an internal structure of a smart secure medium in a wireless communication system according to various embodiments of the disclosure.

Referring to FIG. 21, a smart secure medium may include a transceiver 2110, a controller 2120, and a storage unit 2130.

The controller 2120 controls the overall operation of the smart secure medium, in particular, controls an operation related to an operation of managing a telecom bundle and a telecom profile in a wireless communication system according to embodiments of the disclosure. The operation of managing the telecom bundle and the telecom profile in the wireless communication system according to embodiments of the disclosure has been described in FIGS. 1 to 19, so a detailed description thereof will be omitted herein.

The transceiver 2110 transmits various signals and various messages to other devices included in the wireless communication system under the control of the controller 2120. Here, the various signals and the various messages transmitted by the transceiver 2110 have been described in FIGS. 1 to 19, so a detailed description thereof will be omitted herein.

The transceiver 2110 receives various signals and various messages from the other devices included in the wireless communication system under the control of the controller 2120. Here, the various signals and the various messages received by the transceiver 2110 have been described in FIGS. 1 to 19, so a detailed description thereof will be omitted herein.

The storage unit 2130 stores programs, various data, and/or the like related to the operation of managing the telecom bundle and the telecom profile in the wireless communication system according to embodiments of the disclosure under the control of the controller 2120.

The storage unit 2130 stores the various signals and the various messages received by the transceiver 2110 from the other devices.

Meanwhile, a case in which the smart secure medium is implemented as separate units such as the transceiver 2110, the controller 2120, and the storage unit 2130 has been illustrated in FIG. 21, however, the smart secure medium may be implemented with a form in which at least two of the transceiver 2110, the controller 2120, and the storage unit 2130 are integrated. Also, the smart secure medium may be implemented with at least one processor.

Figure 22:
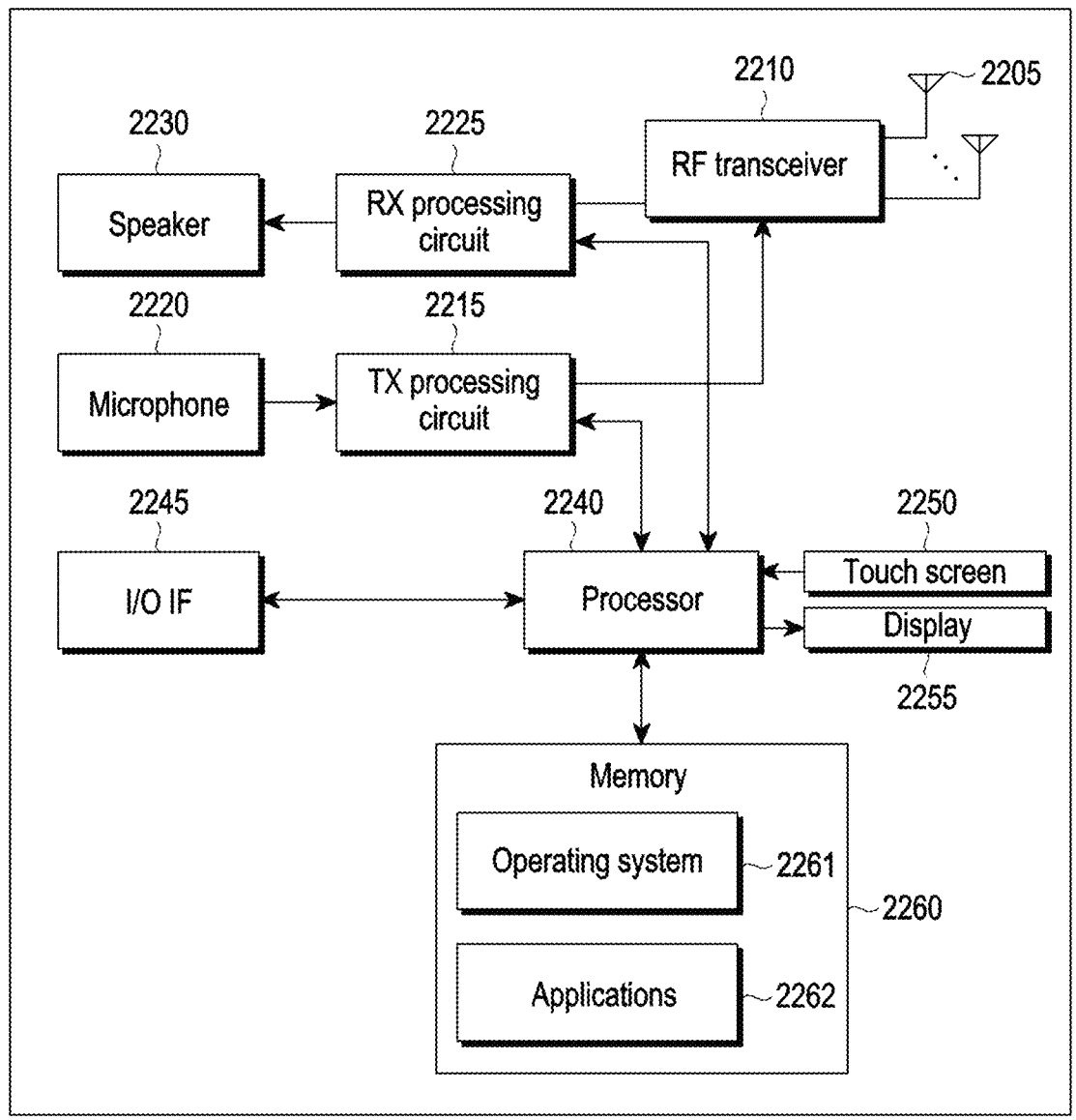
FIG. 22 is a diagram schematically illustrating another example of an internal structure of a terminal in a wireless communication system according to various embodiments of the disclosure.

FIG. 22 is a diagram schematically illustrating another example of an internal structure of a terminal in a wireless communication system according to various embodiments of the disclosure.

An embodiment of a terminal illustrated in FIG. 22 for illustrative purposes only, so FIG. 22 does not limit the scope of the disclosure to a specific implementation of the terminal.

As illustrated in FIG. 22, the terminal may include an antenna 2205, a radio frequency (RF) transceiver 2210, a transmit (TX) processing circuit 2215, a microphone 2220, and a receive (RX) processing circuit 2225. The UE further includes a speaker 2230, a processor 2240, an input/output (I/O) interface (IF) 2245, a touch screen 2250, a display 2255, and a memory 2260. The memory 2260 includes an operating system (OS) 2261 and one or more applications 2262.

The RF transceiver 2210 receives an input RF signal transmitted from a base station in a network, via the antenna 2205. The RF transceiver 2210 down-converts the input RF signal, generating an intermediate frequency (IF) or baseband signal. The IF or baseband signal is transmitted to the RX processing circuit 2225, and the RX processing circuit 2225 filters, decodes, and/or digitizes the baseband or IF signal, generating a processed baseband signal. The RX processing circuit 2225 sends the processed baseband signal to the speaker 2230 (e.g., for speech data) or the processor 2240 (e.g., for web browsing data) for further processing.

The TX processing circuit 2215 receives analog or digital speech data from the microphone 2220 or other output baseband data (e.g., web data, emails, or interactive video game data) from the processor 2240. The TX processing circuit 2215 encodes, multiplexes, and/or digitizes the output baseband data, generating a processed baseband or IF signal. The RF transceiver 2210 receives the processed baseband or IF signal output from the TX processing circuit 2215 and up-converts the baseband or IF signal into an RF signal which is to be transmitted through the antenna 2205.

The processor 2240 may include one or more processors or other processing devices, and may execute the OS 2261 stored in the memory 2260 to control the overall operation of the UE. As an example, the processor 2240 may control reception of downlink channel signals and transmission of uplink channel signals by the RF transceiver 2210, the RX processing circuit 2225, and the TX processing circuit 2215 according to known principles. According to an embodiment, the processor 2240 includes at least one microprocessor or microcontroller.

In various embodiments of the disclosure, the processor 2240 controls the overall operation related to an operation of managing a telecom bundle and a telecom profile. That is, the processor 2240 controls the overall operation related to, for example, the operation of managing a telecom bundle and a telecom profile as described in FIGS. 1 to 19.

The processor 2240 may move data into or out of the memory 2260 as required by a running process. According to an embodiment, the processor 2240 is configured to execute the applications 2262 based on the OS program 2261 or in response to signals received from base stations or the operator. The processor 2240 is coupled to the I/O interface 2245, and the I/O interface 2245 provides the terminal with connectability to other devices, e.g., laptop computers and handheld computers. The I/O interface 2245 is a communication path between these accessories and the processor 2240.

The processor 2240 is also connected to the touch screen 2250 and the display unit 2255. The operator of the terminal may input data into the terminal using the touch screen 2250. The display 2255 may be a liquid crystal display, a light emitting diode display, or other displays capable of rendering text and/or at least limited graphics, such as from websites.

The memory 2260 is connected to the processor 2240. A portion of the memory 2260 may include a random access memory (RAM), and the remainder of the memory 2260 may include a flash memory or a read-only memory (ROM).

Although FIG. 22 illustrates an example of the terminal, various changes may be made thereto. For example, various components in FIG. 22 may be combined together, each component may be further divided, or some components may be omitted, or other components may be added as necessary. As an example, the processor 2240 may be divided into a plurality of multiple processors, such as one or more central processing units (CPUs) and one or more graphics processing units (GPUs). Although the terminal is configured like a mobile phone or a smart phone in FIG. 22, the terminal may be configured to operate as different types of mobile or stationary devices.

According to the disclosure, a terminal may activate a telecom bundle in a specific iSIM port of a multi-SIM MODEM. Accordingly, even if a plurality of logical basebands of the multi-SIM MODEM have different radio access capabilities, the activated telecom bundle may be connected to a logical baseband which corresponds to a user's request and used.

According to the disclosure, it is possible to support a telecom bundle capable of activating a plurality of profiles in a single telecom bundle. In particular, according to the disclosure, a plurality of profiles may be activated and each activated profile may be connected to a specific iSIM port of the multi-SIM MODEM.

According to the disclosure, it is possible to generate a separate iSIM port for a purpose of managing a telecom bundle capable of activating a plurality of profiles.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled/connected with/to the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., program) including instructions that are stored in a storage medium (e.g., internal memory or external memory) that is readable by a machine (e.g., computer). The machine is a device that can invoke the stored instructions from the storage medium and operate according to the invoked instructions, and may include a terminal according to various embodiments. When the instructions are executed by a processor, the processor may perform functions corresponding to the instructions, with or without using one or more other components under the control of the processor. The instructions may include a code generated or executed by a complier or an interpreter.

The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each element (e.g., a module or a program) of the above-described elements may include a single entity or multiple entities, and some of the above-described relevant sub elements may be omitted, or other sub elements may be further included in various embodiments. Alternatively or additionally, some elements (e.g., modules or programs) may be integrated into a single element. In such a case, the integrated element may perform functions, which are performed by the respective relevant elements before the integration, in the same or similar manner. According to various embodiments, operations performed by the module, the program, or another element may be carried out sequentially, in parallel, repeatedly, or heuristically, or one or more of the operations may be executed in a different order or omitted, or one or more other operations may be added.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the disclosure.

In addition, some of all of a specific embodiment of the above-described various embodiments may be performed in connection with some or all of one or more other embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
   activating a first bundle among a plurality of bundles of a smart secure medium connected to the terminal;
   forming, between the activated first bundle and a modulator/demodulator (MODEM) of the terminal, a first application protocol data unit (APDU) pipe used for transferring, to a first secure-related entity within the activated first bundle, a command for controlling the smart secure medium; and
   forming, between the activated first bundle and the MODEM, a second APDU pipe used for transferring an APDU through a first smart secure medium port that is an interface between the smart secure medium and the MODEM,
   wherein the first bundle includes at least one application, or a function for downloading and installing the at least one application.

2. The method of claim 1, wherein activating the first bundle of the smart secure medium comprises:
   detecting a first bundle activation request; and
   transferring, to the smart secure medium, a first bundle activation command corresponding to the first bundle activation request.

3. The method of claim 2, wherein the first bundle activation command includes at least one of an identifier (ID) of the first bundle or an ID of the first smart secure medium port.

4. The method of claim 1, wherein the first APDU pipe is an issuer security domain root (ISD-R) APDU pipe.

5. The method of claim 1, wherein the second APDU pipe is used for transferring the APDU to a profile.

6. The method of claim 1, further comprising:
   forming a mapping relationship between the second APDU pipe and the first smart secure medium port.

7. The method of claim 5, further comprising:
   forming a mapping relationship between the second APDU pipe and the first smart secure medium port.

8. The method of claim 1, further comprising:
   forming, between the activated first bundle and the MODEM of the terminal, a third APDU pipe used for transferring an APDU through a second smart secure medium port that is an interface between the smart secure medium and the MODEM of the terminal.

9. The method of claim 8, wherein the third APDU pipe is used for transferring the APDU to a profile.

10. The method of claim 7, further comprising:
forming a mapping relationship between a third APDU pipe and a third smart secure medium port.

11. A terminal in a wireless communication system, the terminal comprising:
a transceiver; and
a controller connected to the transceiver, wherein the controller is configured to:
activate a first bundle among a plurality of bundles of a smart secure medium connected to the terminal,
form, between the activated first bundle and a modulator/demodulator (MODEM) of the terminal, a first application protocol data unit (APDU) pipe used for transferring, to a first secure-related entity within the activated first bundle, a command for controlling the smart secure medium, and
form, between the activated first bundle and the MODEM, a second APDU pipe used for transferring an APDU through a first smart secure medium port that is an interface between the smart secure medium and the MODEM, and wherein the first bundle includes at least one application, or a function for downloading and installing the at least one application.

12. The terminal of claim 11, wherein the controller is configured to:
detect a first bundle activation request, and
transfer, to the smart secure medium, a first bundle activation command corresponding to the first bundle activation request.

13. The terminal of claim 12, wherein the first bundle activation command includes at least one of an identifier (ID) of the first bundle or an ID of the first smart secure medium port.

14. The terminal of claim 11, wherein the first APDU pipe is an issuer security domain root (ISD-R) APDU pipe.

15. The terminal of claim 11, wherein the second APDU pipe is used for transferring the APDU to a profile.

16. The terminal of claim 11, wherein the controller is further configured to:
form a mapping relationship between the second APDU pipe and the first smart secure medium port.

17. The terminal of claim 15, wherein the controller is further configured to:
form a mapping relationship between the second APDU pipe and the first smart secure medium port.

18. The terminal of claim 11, wherein the controller is further configured to:
form, between the activated first bundle and the MODEM of the terminal, a third APDU pipe used for transferring an APDU through a second smart secure medium port that is an interface between the smart secure medium and the MODEM of the terminal.

19. The terminal of claim 18, wherein the third APDU pipe is used for transferring the APDU to a profile.

20. The terminal of claim 17, wherein the controller is further configured to:
form a mapping relationship between a third APDU pipe and a third smart secure medium port.

* * * * *